(12) United States Patent
Kato et al.

(10) Patent No.: US 7,820,071 B2
(45) Date of Patent: *Oct. 26, 2010

(54) LIGHT MODULATING MATERIAL AND LIGHT MODULATING METHOD

(75) Inventors: Takashi Kato, Kanagawa (JP); Koji Takaku, Kanagawa (JP); Naoyuki Hayashi, Kanagawa (JP); Akihide Osaku, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 12/095,487

(22) PCT Filed: Dec. 8, 2006

(86) PCT No.: PCT/JP2006/324988
§ 371 (c)(1),
(2), (4) Date: May 29, 2008

(87) PCT Pub. No.: WO2007/066824
PCT Pub. Date: Jun. 14, 2007

(65) Prior Publication Data
US 2009/0297735 A1 Dec. 3, 2009

(30) Foreign Application Priority Data
Dec. 9, 2005 (JP) ............................. 2005-356693
Mar. 20, 2006 (JP) ............................. 2006-077572

(51) Int. Cl.
C09K 19/00 (2006.01)
C09K 19/06 (2006.01)
C09K 19/52 (2006.01)
G02F 1/03 (2006.01)
G02F 1/13 (2006.01)

(52) U.S. Cl. ............................. 252/299.01; 252/299.1; 252/299.6; 430/20; 428/1.1; 428/1.3; 349/103; 349/112; 349/130

(58) Field of Classification Search ............ 252/299.01, 252/299.1, 299.6; 430/20; 428/1.1, 1.3; 349/103, 112, 130
See application file for complete search history.

(56) References Cited

U.S. PATENT DOCUMENTS

| | | | |
|---|---|---|---|
| 6,730,241 B2 | 5/2004 | Obi et al. | |
| 6,846,540 B2 | 1/2005 | Yumoto et al. | |
| 7,042,536 B2 | 5/2006 | Hiji et al. | |
| 7,396,573 B2* | 7/2008 | Kato et al. | 428/1.3 |
| 7,623,203 B2* | 11/2009 | Hayashi et al. | 349/106 |
| 2004/0232382 A1 | 11/2004 | Okamura et al. | |
| 2005/0072962 A1 | 4/2005 | Takaku | |
| 2005/0094059 A1 | 5/2005 | Noguchi | |
| 2005/0173673 A1 | 8/2005 | Kitagawa | |
| 2005/0218375 A1 | 10/2005 | Katoh et al. | |
| 2005/0218376 A1 | 10/2005 | Izumi | |
| 2006/0054860 A1 | 3/2006 | Katoh et al. | |
| 2006/0060822 A1 | 3/2006 | Takaku et al. | |
| 2006/0147652 A1 | 7/2006 | Liu et al. | |
| 2006/0263543 A1 | 11/2006 | Takaku et al. | |
| 2006/0269696 A1 | 11/2006 | Kato et al. | |

FOREIGN PATENT DOCUMENTS

| | | |
|---|---|---|
| JP | 2000-347224 A | 12/2000 |
| JP | 2001-21924 A | 1/2001 |
| JP | 2003-192664 A | 7/2003 |
| JP | 2005-120334 A | 5/2005 |
| WO | WO-2006/080573 A | 8/2006 |

OTHER PUBLICATIONS

Mizoshita et al., "Electrooptical properties of liquid-crystalline physical gels: a new oligo(amino acid) gelator for light scattering display materials," J. Mater. Chem., vol. 12, pp. 2197-2201, The Royal Society of Chemistry, 2002, Japan.

* cited by examiner

*Primary Examiner*—Geraldina Visconti
(74) *Attorney, Agent, or Firm*—Birch, Stewart, Kolasch & Birch, LLP

(57) ABSTRACT

A light modulating material comprising at least one kind of dichroic dye having a substituent represented by the following Formula (1) and at least one kind of host liquid crystal between a pair of electrodes, and changing the transmittance of incident light. In the formula (1), Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10.

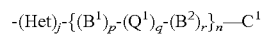

Formula (1):

$-(Het)_j-\{(B^1)_p-(Q^1)_q-(B^2)_r\}_n-C^1$

20 Claims, 2 Drawing Sheets

LIGHT MODULATING MATERIAL AND LIGHT MODULATING METHOD

TECHNICAL FIELD

The present invention relates to a light modulating material and a light modulating method, and in particular belongs to the technical fields of guest-host type light modulating materials and light modulating methods.

BACKGROUND ART

The importance of materials which can adjust an amount of light electrically, so-called electric light modulating materials, has risen along with the rise in the concern about the environment. As for such a light modulating material, a wide range of applications including interior design usage, construction materials usage, vehicle usage, and advertising usage are expected. As the electric light modulating material, an electrochromic type using an oxidation-reduction reaction, a Polymer Dispersed Liquid Crystal (PDLC) type using a composite system of a liquid crystal and a polymer, and the like have been proposed so far. However, in the electrochromic type, making a large area by current driving is difficult, and there are problems such as in that the issue of durability of the electrochromic coloring matter remains, and as for the PDLC type, usage has been limited because it is possible to switch only between a scattered white color and a transparent state, there are cases where the driving voltage is high, and improvement thereof has been demanded.

It is possible to obtain bright modulated light in a light modulating material using the guest-host type, and the type is expected to be a suitable type for modulated light usage. However, there are case where light modulating materials described in Japanese Patent Application Laid-Open (JP-A) No. 2000-347224 and the like are still not at the level at which light modulating performance has to be satisfied, and improvement thereof has been demanded. Moreover, there are cases where there are problems with the conventional guest-host type from the viewpoint of durability, and the improvement thereof has been demanded.

DISCLOSURE OF INVENTION

As described above, in the light modulating material using the usual guest-host type, it has been difficult to obtain satisfactory light modulating performance. The present inventor earnestly studied to obtain the finding that a light modulating material providing an extremely high modulating performance can be achieved by combination with a specific dichroic dye, and has carried out further examination based on this finding, resulting in completion of the present invention.

The means for solving the above-described problems is as follows.

A first aspect of the present invention is to provide a light modulating material comprising at least one kind of dichroic dye having a substituent represented by the following Formula (1) and at least one kind of host liquid crystal between a pair of electrodes, and changing the transmittance of incident light:

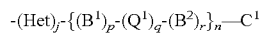   Formula (1)

wherein, Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group, j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

A second aspect of the present invention is to provide the light modulating material according to the first aspect, further comprising an ultraviolet absorption layer.

A third aspect of the present invention is to provide the light modulating material according to the first or second aspect, wherein a liquid crystal composition which contains the dichroic dye and the host liquid crystal is contained between a pair of supports equipped with transparent electrodes, and a ratio ($T_0/T$), of a light transmittance $T_0$ in a transparent and colorless state to a light transmittance T in a colored state, is in a range of 3 to 1000.

A fourth aspect of the present invention is to provide the light modulating material according to any one of the first to third aspects, wherein at least one dichroic dyes is a compound represented by the following Formula (2):

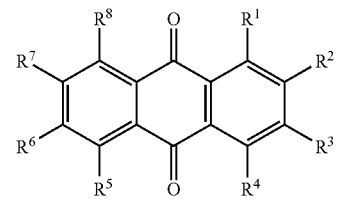

Formula (2)

wherein at least one of $R^1$, $R^2$, $R^3$, $R^4$, $R^5$, $R^6$, $R^7$, and $R^8$ is -(Het)$_j$-$\{(B^1)_p\text{-}(Q^1)_q\text{-}(B^2)_r\}_n$—$C^1$, and the others are each independently hydrogen atom or a substituent; Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group or an acyloxy group; j represents 0 or 1; p, q and r each independently represent an integer from 0 to 5; n represents an integer from 1 to 3; (p+r)×n is an integer from 3 to 10, when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

A fifth aspect of the present invention is to provide the light modulating material according to any one of the first to fourth aspects, wherein at least one dichroic dyes is a compound represented by the following Formula (3):

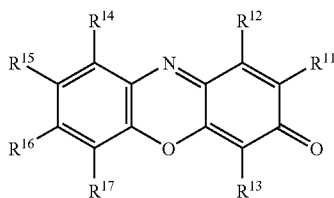

Formula (3)

wherein at least one of $R^{11}, R^{12}, R^{13}, R^{14}, R^{15}, R^{16}$, and $R^{17}$ is -(Het)$_j$-{(B$^1$)$_p$-(Q$^1$)$_q$-(B$^2$)$_r$}$_n$—C$^1$, and the others are each independently hydrogen atom or a substituent; Het is oxygen atom or sulfur atom; B$^1$ and B$^2$ each independently represent an arylene group, a heteroarylene group or a bivalent cyclic aliphatic hydrocarbon group; Q$^1$ represents a bivalent linking group; C$^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by B$^1$ may be the same or different; when q is 2 or larger, two or more groups represented by Q$^1$ may be the same or different; when r is 2 or larger, two or more groups represented by B$^2$ may be the same or different; and when n is 2 or larger, two or more groups represented by {(B$^1$)$_p$-(Q$^1$)$_q$-(B$^2$)$_r$} may be the same or different.

A sixth aspect of the present invention is to provide the light modulating material according to any one of the first to fifth aspects, wherein the host liquid crystal is a nematic liquid crystal.

A seventh aspect of the present invention is to provide the light modulating material according to any one of the first to sixth aspects, wherein the host liquid crystal exhibits a dual frequency addressing property.

An eighth aspect of the present invention is to provide the light modulating material according to any one of the first to seventh aspects, wherein the host liquid crystal contains a chiral reagent.

A ninth aspect of the present invention is to provide the light modulating material according to any one of the first to eighth aspects, wherein the host liquid crystal contains a polymer.

A tenth aspect of the present invention is to provide the light modulating material according to any one of the first to ninth aspects, wherein the material modulates light by:

(1) changing between a colored transparent state and a colorless transparent state;

(2) changing between a colored scattered state and a colorless transparent state; or (3) changing between a high-density colored transparent state and a low-density colored transparent state.

An eleventh aspect of the present invention is to provide the light modulating material according to any one of the first to tenth aspects, further comprising a polymeric support.

A twelfth aspect of the present invention is to provide the light modulating material of any one of the third to eleventh aspects, wherein the transparent electrodes comprise ITO.

A thirteenth aspect of the present invention is to provide the light modulating material according to any one of the first to twelfth aspects, further comprising an alignment film.

A fourteenth aspect of the present invention is to provide the light modulating material according to the thirteenth aspect, wherein the alignment film is a polyimide alignment film or a film formed by a silane coupling agent.

A fifteenth aspect of the present invention is to provide the light modulating material according to any one of the first to fourteenth aspects, further comprising an antireflection film.

A sixteenth aspect of the present invention is to provide the light modulating material according to the fifteenth aspect, wherein the antireflection film is attached on the surface of a support.

A seventeenth aspect of the present invention is to provide the light modulating material according to the fifteenth or sixteenth aspect, wherein the antireflection film is attached on the surface of a transparent electrode.

An eighteenth aspect of the present invention is to provide the light modulating material according to any one of the fifteenth to seventeenth aspects, wherein the antireflection fifty is an inorganic film, an organic film, or an inorganic-organic composite film.

A nineteenth aspect of the present invention is to provide the light modulating material according to any one of the first to eighteenth aspects, further comprising a barrier layer.

A twentieth aspect of the present invention is to provide a light modulating method using the light modulating material according to any one of the first to nineteenth aspects, wherein the light modulating material is driven by switching at least between a no-voltage application state and a voltage application state.

A twenty-first aspect of the present invention is to provide a light modulating method using the light modulating material according to any one of the first to nineteenth aspects, wherein the light modulating material is driven by switching between application of voltages having a different frequencies.

According to the present invention, a light modulating material and a light modulating method of showing a high light modulating performance can be offered.

BEST MODE FOR CARRYING OUT THE INVENTION

Figure 1:
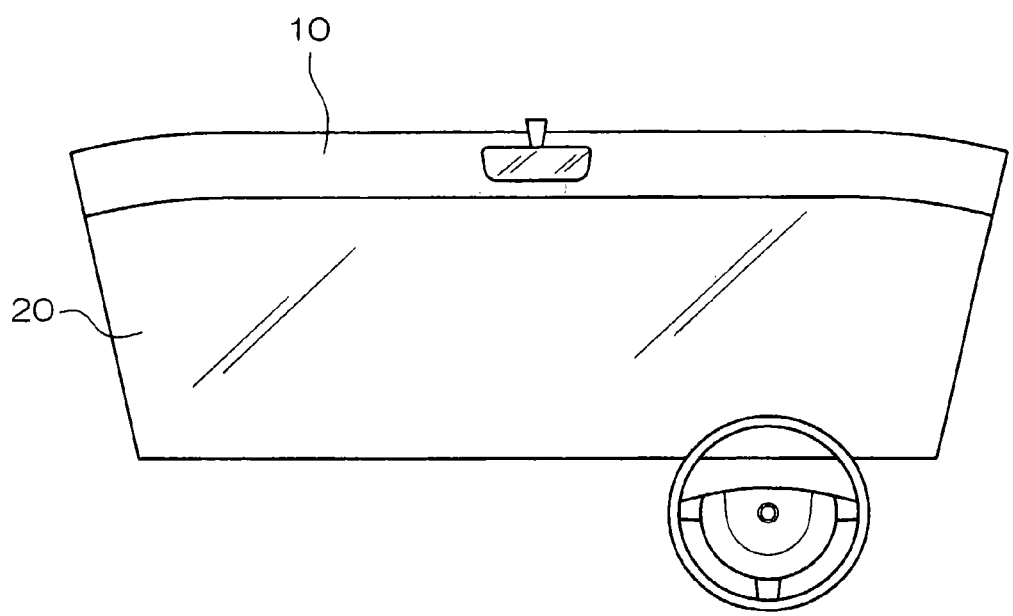
FIG. 1 shows the light modulating material of the present invention being used at the inner side of an automobile windshield.

The present invention will be described in detail below. In the present specification " . . . to . . . " represents a range including the numeral values represented before and after "to" as a minimum value and a maximum value, respectively.

The light modulating material of the present invention contains at least one kind of dichroic dye having a substituent represented by the following Formula (1) and at least one kind of host liquid crystal.

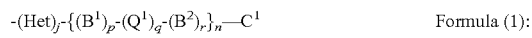

Formula (1):

In the formula, Het is oxygen atom or sulfur atom; B$^1$ and B$^2$ each independently represent an arylene group, a heteroarylene group or a bivalent cyclic aliphatic hydrocarbon group; Q$^1$ represents a bivalent linking group; C$^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

For example, it is desirable that light modulating glass or the like, in which the light transmittance from a window is arbitrarily modulated, is clearly in a colored state or a scattered and cloudy state under a certain condition, and is in an extremely high transparent state under other conditions.

The light modulating material of the present invention can modulate light by changing between a transparent and colored state and a transparent and colorless state, or can modulate light by changing between a scattered and colored state and a transparent and colorless state, through changing the aligned state of the host liquid crystal. Moreover, when change between the colored and transparent state and the transparent and colorless state is carried out, change between a high density colored and transparent state and a low density colored and transparent state may also be carried out.

Particularly, because the light modulating material of the present invention uses the dichroic dye having a substituent represented by the formula (1), the difference in the amount of light absorbed between the colored state and the transparent and colorless state becomes excellent, and the light modulating material exhibits high light modulating performance in which high coloring is exhibited when the aligned state of the host liquid crystal is horizontal to the surface of the support, and the light transmission increases when the aligned state is vertical to the surface of the support.

Further, as for the light modulating material, the observer observes a state where light has passed through the light modulating material only once, while for the liquid crystal display element, the observer observes a state where the outside light has been reflected by the reflector plate after passing through the liquid crystal display element, and then has passed through the liquid crystal display element again. Consequently, in the case of the light modulating material, it is necessary to absorb light more efficiently by the dichroic dye than in the case of the liquid crystal display element, and it is not clear whether a high light modulating performance can be obtained when the composition of the liquid crystal display element is simply used for the light modulating material as it is.

The light modulating material of the present invention is composed by providing at least one liquid crystal layer which contains at least the dichroic dye and the host liquid crystal. Further, in the present specification, the composition constituting the liquid crystal layer is referred to as a "liquid crystal composition", and the liquid crystal composition contains at least the dichroic dye and the host liquid crystal, and can further contain other additives.

<The Liquid Crystal Layer>

(The Dichroic Dye)

The dichroic dye to be used in the light modulating material of the present invention is preferably a dichroic dye having at least one substituent represented by the following formula (1)

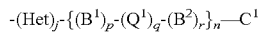  Formula (1):

In the formula, Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

In the light modulating material of the present invention, the dichroic dye is defined as a compound which is dissolved in a host liquid crystal and has a function of absorbing light. While the absorption maximum and the absorbing band of the dichroic dye are not particularly restricted, it is preferred that the dye has an absorption maximum in a yellow region (Y), a magenta region (M) or a cyan region (C). Moreover, two or more kinds of dichroic dyes may be used, and it is preferable to use the mixture of dichroic dyes which have the maximum absorption in Y, M, and C. As for the method of carrying out the full-color display by mixing the yellow dye, the magenta dye, and the cyan dye, the detail is described in "Color Chemistry" (written by Sumio Tokita, Maruzen, 1982). Here, the yellow region means in a range of 430 to 490 nm, the magenta region in a range of 500 to 580 nm, and the cyan region in a range of 600 to 700 nm.

Next, a chromophore to be used for the dichroic dye of the present invention will be described.

Any chromophoric group of the dichroic dye may be used, including, for example, azo dyes, anthraquinone dyes, perylene dyes, merocyanine dyes, azomethine dyes, phthaloperylene dyes, indigo dyes, azulene dyes, dioxadine dyes, polythiophene dyes, and phenoxadine dyes. Preferred are azo dyes, anthraquinone dies, phenoxazine dyes, and particularly preferred are anthraquinone dyes, or phenoxazone dyes (phenoxazine-3-one).

The azo dyes may be any of monoazo dyes, bisazo dyes, trisazo dyes, tetrakisazo dyes, and pentakisazo dyes, and preferred are monoazo dyes, bisazo dyes, trisazo dyes and the like.

The cyclic structure contained in the azo dye may be heterocyclic rings (quinone ring, pyridine ring, thiazole ring, benzothiazole ring, oxazole ring, benzooxazole ring, imidazole ring, benzoimidazole ring, pyrimidine ring, etc.) in addition to aromatic groups (benzene ring, naphthalene ring, etc.).

The substituent for the anthraquinone dye is preferably those containing an oxygen atom, sulfur atom, or nitrogen atom and includes, for example, a alkoxy group, an aryloxy group, an alkylthio group, an arylthio group, an alkylamino group, and an arylamino group. The number of substitution of the substituent may be of any number and di-substitution, tri-substitution, or tetrakis-substitution is preferred, and di-substitution and tri-substitution are particularly preferred. The substitution of the substituent may be at any position and preferred structure is 1,4-di-substitution, 1,5-di-substitution, 1,4,5-tri-substitution, 1,2,4-tri-substitution, 1,2,5-tri-substituion, 1,2,4,5-tetra-substitution, and 1,2,5,6-tetra-substitution.

The substituent for the phenoxazone dye (phenaxazin-3-on) is preferably those containing an oxygen atom, sulfur atom, or nitrogen atom and includes, for example, an alkoxy group, an aryloxy group, an alkylthio group, an arylthio group, an alkylamino group, and an arylamino group.

A substituent represented by the following formula (1) will be described.

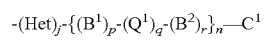  Formula (1):

In the formula, Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p\text{-}(Q^1)_q\text{-}(B^2)_r\}$ may be the same or different.

Het is oxygen atom or sulfur atom, particularly preferably sulfur atom. $B^1$ and $B^2$ each independently represent an arylene group, a heteroarylene group, or a bivalent cyclic aliphatic hydrocarbon group, and any group may have or not have a substituent.

The arylene group represented by $B^1$ and $B^2$ is preferably an arylene group having 6 to 20 carbon atoms, more preferably 6 to 10 carbon atoms. Specific examples of preferred arylene group include, for example, phenylene group, naphthalene group, and anthracene group, particularly preferably a substituted phenylen group, and further preferably 1,4-phenylene group.

The heteroarylene group represented by $B^1$ and $B^2$ is preferably an heteroarylene group having 1 to 20 carbon atoms, and more preferably an heteroarylene group having 2 to 9 carbon atoms. Specific examples of preferred heteroarylene group include, for example, a group comprising pyridine ring, quinoline ring, isoquinoline ring, pyrimidine ring, pyrazine ring, thiophene ring, furan ring, oxazole ring, thiazole ring, imidazole ring, pyrazole ring, oxadiazole ring, thiadiazole ring, and triazole ring, as well as a heteroarylene group obtained by eliminating hydrogen atoms each by one from two carbon atoms in a condensed ring formed by ring condensation thereof.

The bivalent cycloaliphatic hydrocarbon group represented by $B^1$ and $B^2$ is preferably a bivalent cycloaliphatic hydrocarbon group having, preferably 3 to 20 carbon atoms, more preferably 4 to 10 carbon atoms. Specific examples of preferred bivalent cycloaliphatic hydrocarbon group include a cyclohexanediyl and cyclopentanediyl, more preferably cyclohexane-1,2-diyl, cyclohexane-1,3-diyl, cyclohexane-1,4-diyl, and cyclopentane-1,3-diyl, particularly preferably (E)-cyclohexane-1,4-diyl.

An arylene group, a heteroarylene group, and a bivalent cyclic aliphatic hydrocarbon group represented by $B^1$ and $B^2$ may further have a substituent, and the substituent includes the following substituent group V.

(Substituent Group V)

Halogen atoms (for example, chlorine, bromine, iodine, fluorine), the mercapto group, a cyano group, a carboxyl group, a phosphoric group, a sulfo group, a hydroxy group, a carbamoyl group having 1 to 10 carbon atoms, preferably 2 to 8 carbon atoms, and more preferably 2 to 5 carbon atoms (for example, methyl carbamoyl, ethyl carbamoyl, morpholinocarbamoyl), a sulfamoyl group having 0 to 10 carbon atoms, preferably 2 to 8 carbon atoms, and more preferably 2 to 5 carbon atoms (for example, methylsulfamoyl, ethylsulfamoyl, piperidinosulfamoyl), a nitro group, an alkoxy group having 1 to 20 carbon atoms, preferably 1 to 10 carbon atoms, and more preferably 1 to 8 carbon atoms (for example, methoxy, ethoxy, 2-methoxyethoxy, 2-phenylethoxy), an aryloxy group having 6 to 20 carbon atoms, preferably 6 to 12 carbon atoms, and more preferably 6 to 10 carbon atoms (for example, phenoxy, p-methylphenoxy, p-chlorophenoxy, naphthoxy), an acyl group having 1 to 20 carbon atoms, preferably 2 to 12 carbon atoms, and more preferably 2 to 8 carbon atoms (for example, acethy, benzoyl, trichloroacetyl), an acyloxy group having 1 to 20 carbon atoms, preferably having 2 to 12 carbon atoms, and more preferably 2 to 8 carbon atoms (for example, acetyloxy, benzoyloxy), an acylamino group having 1 to 20 carbon atoms, preferably having 2 to 12 carbon atoms, and more preferably 2 to 8 carbon atoms (for example, acetylamino), a sulfonyl group having 1 to 20 carbon atoms, preferably 1 to 10, and more preferably 1 to 8 carbon atoms (for example, methanesulfony, ethanesulfonyl, benzenesulfonyl), a sulfinyl groups having 1 to 20 carbon atoms, preferably 1 to 10, and more preferably 1 to 8 carbon atoms (for example, methanesulfinyl, ethanesulfinyl, benzenesulfinyl), a substituted or unsubstituted amino group having 1 to 20 carbon atoms, preferably 1 to 12 carbon atoms, and more preferably 1 to 8 carbon atoms (for example, amino, methylamino, dimethylamino, benzylamino, anilino, diphenylamino, 4-methylphenylamino, 4-ethylphenylamino, 3-n-propylphenylamino, 4-n-propylphenylamino, 3-n-butylphenylamino, 4-n-butylphenylamino, 3-n-pentylphnylamino, 4-n-pentylphenylamino, 3-trifluoromethylphenylamino, 4-trifluoromethylphenylamino, 2-pyridylamino, 3-pyridylamino, 2-thiazolylamino, 2-oxazolylamino, N,N-methylphenylamino, N,N-ethylphenyl amino), an ammonium group having 0 to 15 carbon atoms, preferably 3 to 10 carbon atoms, more preferably 3 to 6 carbon atoms (for example, trimethylammonium, triethylammonium) a hydrazino group having 0 to 15 carbon atoms, preferably 1 to 10 carbon atoms, and more preferably 1 to 6 carbon atoms (for example, trimethylhydrazino), an ureido group having 1 to 15 carbon atoms, preferably 1 to 10 carbon atoms, and more preferably 1 to 6 carbon atoms (for example, ureido group, N,N-dimethylureido group), an imido group having 1 to 15 carbon atoms, preferably 1 to 10 carbon atoms, and more preferably 1 to 6 carbon atoms (for example, succinimide group), an alkylthio group having 1 to 20 carbon atoms, preferably 1 to 12 carbon atoms, and more preferably 1 to 8 carbon atoms (for example, methylthio, ethylthio, propylthio), an arylthio group having 6 to 80 carbon atoms, preferably 6 to 40 carbon atoms, and more preferably 6 to 30 carbon atoms (for example, phenylthio, p-methylphenylthio, p-chlorophenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, 4-propylphenyl-2-ethynyl-4'-biphenylthio), a heteroarylthio group having 1 to 80 carbon atoms, preferably 1 to 40 carbon atoms, and more preferably 1 to 30 carbon atoms (for example, 2-pyridylthio, 3-pyridylthio, 4-pyridylthio, 2-quinolylthio, 2-furilthio, 2-pyrrolylthio), an alkoxycarbonyl groups having 2 to 20 carbon atoms, preferably 2 to 12 carbon atoms, and more preferably 2 to 8 carbon atoms (for example, methoxycarbonyl, ethoxycarbonyl, 2-benzyloxycarbonyl), an aryloxycarbonyl group having 6 to 20 carbon atoms, preferably 6 to 12 carbon atoms, and more preferably 6 to 10 carbon atoms (for example, phenoxycarbonyl), an unsubstituted alkyl group having 1 to 18 carbon atoms, preferably 1 to 10 carbon atoms, and more preferably 1 to 5 carbon atoms (for example, methyl ethyl, propyl, butyl), a substituted alkyl group having 1 to 18 carbon atoms, preferably 1 to 10 carbon atoms, and more preferably 1 to 5 carbon atoms {for example, hydroxymethyl, trifluoromethyl, benzyl, carboxyethyl, ethoxycarbonylmethyl, acetylaminomethyl, moreover, in here, an unsaturated hydrocarbon group having 2 to 18 carbon atoms, preferably 3 to 10 carbon atoms, and more preferably 3 to 5 carbon atoms (for example, a vinyl group, an ethynyl group, an 1-cyclohexenyl group, a benzylidyne group, a benzylidene group) will be included in the substituted alkyl groups}, a substituted or unsubstituted aryl group having 6 to 20 carbon atoms, preferably 6 to 15 carbon atoms, and more preferably 6 to 10 carbon atoms (for example, phenyl, naphthyl, p-carboxyphenyl, p-nitrophenyl, 3,5-dichlorophenyl, p-cyanophenyl, m-fluorophenyl, p-tolyl, 4-propylcyclohexyl-4'-biphenyl, 4-butylcyelohexyl-4'-biphenyl, 4-pentylcyclohexyl-4'-biphenyl, 4-propylphenyl-2-ethynyl-4'-biphenyl), a substituted or unsubstituted heteroaryl group having 1 to 20 carbon atoms, preferably 2 to 10 carbon atoms, and more preferably 4 to 6 carbon atoms (for example, pyridyl, 5-methylpyridyl, thienyl, furyl, morpholino, tetrahydrofurfuryl).

Those substituent groups V may have a structure in which a benzene ring or a naphthalene ring is condensed. Further, the substituent illustrated by the explanation for V explained so far may further be substituted on the substituents described above.

Among the substituent groups V, a preferred substituents include an above-described alkyl group, an aryl group, an alkoxy group, an aryloxy group, halogen atom, amino group, a substituted amino group, a hydroxy group, and an alkylthio group, and further preferably an alkyl group, an aryl group, and halogen atom.

$Q^1$ represents a bivalent linking group. Preferable is a connecting group which consists of the atomic group composed of at least one atom selected from the carbon atom, the nitrogen atom, the sulfur atom, and the oxygen atom.

The bivalent linking group represented by $Q^1$ is a bivalent linking group having preferably 0 to 60 carbon atoms, more preferably 0 to 30 carbon atoms, and further preferably 0 to 20 carbon atoms.

Further, the bivalent linking group represented by $Q^1$ preferably includes bivalent linking groups comprising an alkylene group having preferably 1 to 20 carbon atoms and more preferably 1 to 10 carbon atoms (for example, methylene, ethylene, propylene, butylenes, pentylene, cyclohexyl-1,4-diyl), an alkenylene group having preferably 2 to 20 carbon atoms and more preferably 2 to 10 carbon atoms (for example, ethenylene), an alkynylene groups having preferably 2 to 20 carbon atoms and more preferably 2 to 10 carbon atoms (for example, ethynylene), an amide group, an ether group, an erter group, a sulfoamide group, a sulfonate group, an ureido group, a sulfonyl group, a sulfinyl group, a thioether group, a carbonyl group, an —NR— group (herein, R represents hydrogen atom, an alkyl group, or an aryl group. An alkyl group represented by R is an alkyl group having preferably 1 to 20 carbon atoms and more preferably 1 to 10 carbon atoms. A aryl group represented by R is an aryl group having preferably 6 to 14 carbon atoms and more preferably 6 to 10 carbon atoms), an azo group, an azoxy group, and a bivalent heterocyclic group (a bivalent heterocyclic group having preferably 2 to 20 carbon atoms and more preferably 4 to 10 carbon atoms, for example, piperazine-1,4-diyl) or as a combination of two or more of them.

As a bivalent linking group represented by $Q^1$, an alkylene group, an alkenylene group, an alkynylene group, an ether group, a thioether group, an amide group, an ester group, a carbonyl group and a combination of two or more of them are preferable.

$Q^1$ may further have a substituent, and the substituent group V is enumerated as the substituent.

$C^1$ represents an alkyl group, a cycloalkyl group, an alkoxy group, an alkoxycarbonyl group, an acyl group, or an acyloxy group. The alkyl group, the cycloalkyl group, the alkoxy group, the alkoxycarbonyl group, the acyl group, or the acyloxy group, which is represented by $C^1$, is also included each group which has a substituent.

$C^1$ preferably represents an alkyl and a cycloalkyl group having 1 to 30 carbon atoms, more preferably 1 to 12 carbon atoms, and further preferably 1 to 8 carbon atoms (for example, methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl, benzyl), an alkoxy group having 1 to 20 carbon atoms, more preferably 1 to 10 carbon atoms, and further preferably 1 to 8 carbon atoms (for example, methoxy, ethoxy, 2-methoxyethoxy, 2-phenylethoxy), an acyloxy group having 1 to 20 carbon atoms, more preferably 2 to 12 carbon atoms, and further preferably 2 to 8 carbon atoms (for example, acetyloxy, benzoyloxy), an acyl group having 1 to 30 carbon atoms, more preferably 1 to 12 carbon atoms, and further preferably 1 to 8 carbon atoms (for example, acetyl, formyl, pivaloyl, 2-chloroacetyl, stearoyl, benzoyl, p-n-octyloxyphenylcarbonyl), or an alkoxycarbonyl group having 2 to 20 carbon atoms, more preferably 2 to 12 carbon atoms, and further preferably 2 to 8 carbon atoms (for example, methoxycarbonyl, ethoxycarbonyl, 2-benzyloxycarbonyl).

$C^1$ represents particularly preferably an alkyl group or an alkoxy group, and more preferably ethyl, propyl, butyl, pentyl, hexyl, or trifluoromethoxy.

$C^1$ may further have a substituent, and the substituent group V is enumerated as the substituent.

A substituent for the alkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the cycloalkyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, an aryloxycarbonyl group, and an alkyl group.

A substituent for the alkoxy group represented by $C^1$ preferably includes, among the substituent group V, a halogen atom (particularly, fluorine atom), a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the alkoxycarbonyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, and an aryloxycarbonyl group.

A substituent for the acyl group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group and an aryloxycarbonyl group.

A substituent for the acyloxy group represented by $C^1$ preferably includes, among the substituent group V, a halogen atom, a cyano group, a hydroxy group, a carbamoyl group, an alkoxy group, an aryloxy group, an acyl group, an acyloxy group, an acylamino group, an amino group, an alkylthio group, an arylthio group, a heteroarylthio group, an alkoxycarbonyl group, or an aryloxycarbonyl group.

j represents 0 or 1, and preferably 0.

p, q and r each independently represents an integer from 0 to 5, and n represents an integer from 1 to 3. The total number of the groups represented by $B^1$ and $B^2$, that is, $(p+r)\times n$ is an integer from 3 to 10, more preferably an integer from 3 to 5. In a case where p, q, or r is 2 or greater, two or more $B^1$, $Q^1$ and $B^2$ may be identical or different with each other respectively, and in a case where n is 2 or greater, $\{(B^1)_p\text{-}(Q^1)_q\text{-}(B^2)_r\}$ may be identical or different with each other.

Preferable combinations of p, q, r, and n will be described as follows.

(i) p=3, q=0, r=0, n=1
(ii) p=4, q=0, r=0, n=1
(iii) p=5, q=0, r=0, n=1
(iv) p=2, q=0, r=0, n=1
(v) p=2, q=1, r=1, n=1
(vi) p=1, q=1, t=2, n=1
(vii) p=3, q=1, r=1, n=1
(viii) p=2, q=0, r=2, n=1
(ix) p=1, q=1, r=1, n=2
(x) p=2, q=1, r=1, n=2

Particularly preferable combinations are (i) p=3, q=0, r=0, n=1; (iv) p=2, q=0, r=1, n=1; and (v) p=2, q=1, r=1, n-1.

Further, $-\{(B^1)_p\text{-}(Q^1)_q\text{-}(B^2)_r\}_n\text{—}C^1$ is preferable to contain a partial structure to exhibit the liquid crystal property. Herein, the liquid crystal may be any phase, preferably is a nematic liquid crystal, a smectic liquid crystal, and a discotic liquid crystal, and particularly preferably a nematic liquid crystal.

Specific examples of $-\{(B^1)_p\text{-}(Q^1)_q\text{-}(B^2)_r\}_n\text{—}C^1$ are shown below, but the present invention should not be limited to them (in the following chemical formulas, the wavy line shows the connecting position).

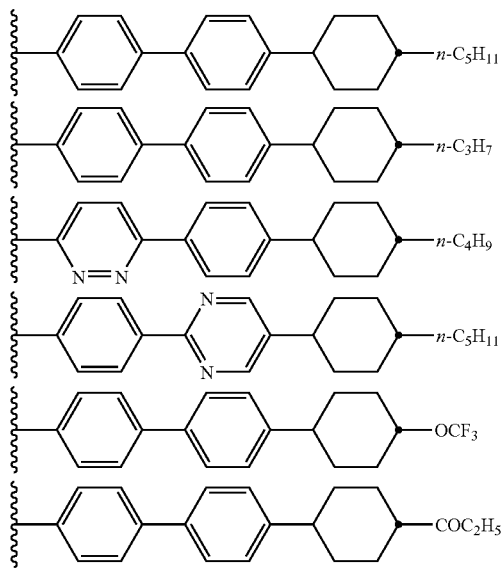

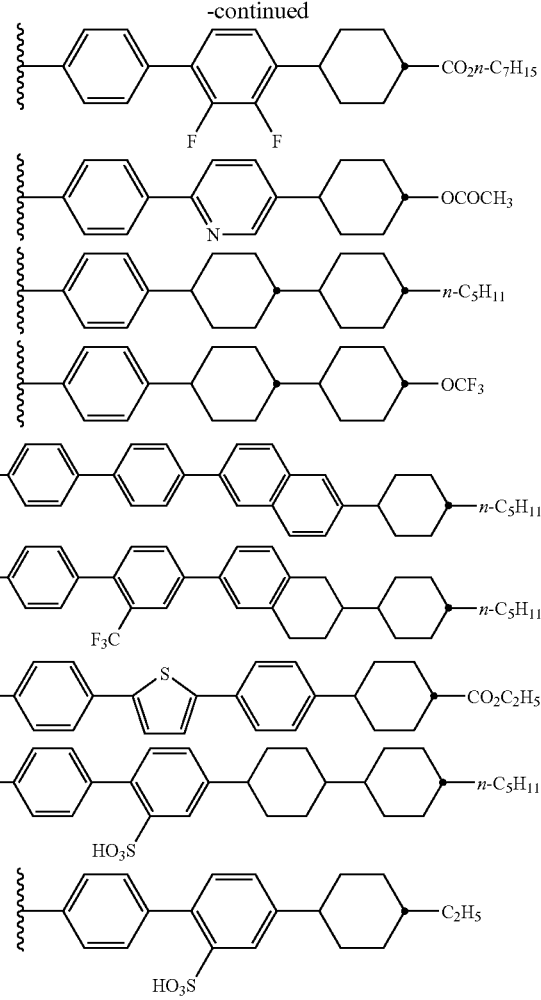

The dichroic dye used in the present invention has preferably one or more, more preferably 1 to 8, further preferably 1 to 4, and particularly preferably 1 to 2 substituents represented by $-\{(B^1)_p\text{-}(Q^1)_q\text{-}(B^2)_r\}_n\text{—}C^1$.

A preferred structure of the substituent represented by the Formula (1) includes combinations described below.

[1] A structure in which Het represents sulfur atom, $B^1$ represents an aryl group or a heteroaryl group, $B^2$ represents cyclohexane-1,4-diyl group, $C^1$ represents an alkyl group, and j=1, p=2, q=0, r=1, and n=1.

[2] A structure in which Het represents sulfur atom, $B^1$ represents an aryl group or a heteroaryl group, $B^2$ represents cyclohexane-1,4-diyl group, $C^1$ represents an alkyl group, and j=1, p=1, q=0, r=2 and n=1.

Especially preferred structures are:

[1] a structure represented by the following Formula (a-1), in which Het represents sulfur atom, $B^1$ represents a 1,4-phenylene group, $B^2$ represents trans-cyclohexyl group, $C^1$ represents an alkyl group (preferably, methyl, ethyl, propyl, butyl, pentyl, or hexyl), and j=1, p=2, q=0, r=1 and n=1, and

[2] a structure represented by the following Formula (a-2), in which Het represents a sulfur atom, $B^1$ represents 1,4-phenylene, $B^2$ represents trans-cylohexane-1,4-diyl, $C^1$ represents an alkyl group (preferably, methyl, ethyl, propyl, butyl, pentyl, or hexyl), and j=1, p=1, q=0, r=2 and n=1.

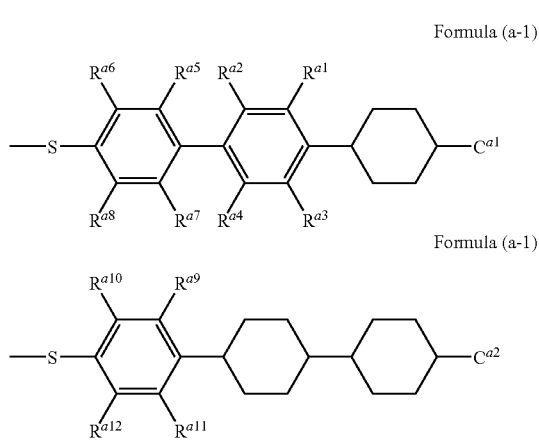

Formula (a-1)

Formula (a-1)

In the Formulae (a-1) and (a-2), $R^{a1}$ to $R^{a12}$ each independently represents a hydrogen atom or a substituent. The substituent includes, for example, a substituent selected from the substituent group V. $R^{a1}$ to $R^{a12}$ each independently represents preferably hydrogen atom, a halogen atom (particularly, fluorine atom), an alkyl group, an aryl group, and an alkoxy group. Among the alkyl group, aryl group, and alkoxy group represented by $R^{a1}$ to $R^{a12}$, preferred are those identical with the alkyl group, aryl group, and alkoxy group described for the substituent group V.

In the Formulae (a-1) and (a-2), $C^{a1}$ and $C^{a2}$ each independently represents an alkyl group, and an alkyl group having preferably 1 to 20 carbon atoms, more preferably 1 to 10 carbon atoms, and particularly preferably methyl, ethyl, propyl, butyl, pentyl, or hexyl, heptyl, octyl, or nonyl.

Among the formulas (a-1) and (a-2), particularly $C^{a1}$ and $C^{a2}$, which have a straight chain alkyl group having 3 to 10 carbon atoms, is suitable for use in the light modulating material, because the solubility in the host liquid crystal is improved and the amount of light absorbed in the colored state is increased. The reason is not clarified, but it is guessed that the reason would be in the improvement in the compatibility with the host liquid crystal.

The azo dye may be any of monoazo dye, bisazo dye, trisazo dye, tetrakisazo dye, or pentakisazo dye, and preferably a monoazo dye, bisazo dye and trisazo dye.

A ring structure contained in the azo dye includes, in addition to aromatic groups (benzene ring, naphthalene ring, etc.), hetero rings (quinoline ring, pyridine ring, thiazole ring, benzothiazole ring, oxazole ring, benzooxazole ring, imidazole ring, benzoimidazole ring, pyrimidine ring, etc.).

The substituent for the anthraquione dye preferably includes those containing an oxygen atom, sulfur atom or nitrogen atom, for example, an alkoxy group, an aryloxy group, an alkylthio group, an arylthio group, an alkylamino group, and an arylamino group.

While the number of substitution for the substituent may be of any number, and di-substitution, tri-substitution, and tetra-substitution are preferred, and di-substitution, tri-substitution are particularly preferred. The substitution of the substituent may be at any position adopted, but preferred are 1,4-di-substitution, 1,5-di-substitution, 1,4,5-tri-substitution, 1,2,4-tri-substitution, 1,2,5-tri-substitution, 1,2,4,5-tetra-substitution, and 1,2,5,6-tetra-substitution structure.

The anthraquinone dye is more preferably a compound represented by the following Formula (2), and the phenoxazone dye is more preferably a compound represented by the following formula (3).

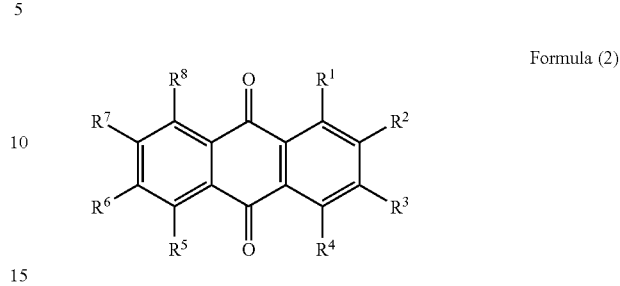

Formula (2)

In the Formula (2), at least one of $R^1$, $R^2$, $R^3$, $R^4$, $R^5$, $R^6$, $R^7$ and $R^8$ represents $-(Het)_j-\{(B^1)_p-(Q^1)_q-(B^2)_r\}_n-C^1$, and others each independently represents hydrogen atom or a substituent.

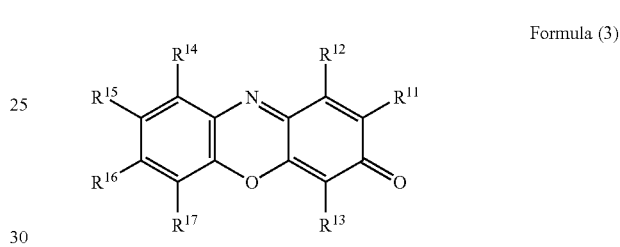

Formula (3)

In the formula (3), at least one or more of $R^{11}$, $R^{12}$, $R^{13}$, $R^{14}$, $R^{15}$, $R^{16}$, and $R^{17}$, represents $-(Het)_j-\{(B^1)_p-(Q^1)_q-(B^2)_r\}_n-C^1$, and the others each independently represents hydrogen atom or a substituent.

Here, Het, $B^1$, $B^2$, $Q^1$, p, q, r, n, and $C^1$ have the same definitions as Het, B, $B^2$, $Q^1$, p, q, r, n, and $C^1$ in the formula (1).

In the formula (2), the above substituents represented by $R^1$, $R^2$, $R^3$, $R^4$, $R^5$, $R^6$, $R^7$, and $R^8$ include the substituent group V, preferably include arylthio groups having 6 to 80 carbon atoms, more preferably 6 to 40 carbon atoms, and further preferably 6 to 30 carbon atoms (for example, phenylthio, p-methylphenylthio, p-chlorophenylthio, 4-methylphenylthio, 4-ethylphenylthio, 4-n-propylphenylthio, 2-n-butylphenylthio, 3-n-butylphenylthio, 4-n-butylphenylthio, 2-t-butylphenylthio, 3-t-butylphenylthio, 4-t-butylphenylthio, 3-n-pentylphenylthio, 4-n-pentylphenylthio, 4-amylpentylphenylthio, 4-hexylphenylthio, 4-heptylphenylthio, 4-octylphenylthio, 4-trifluoromethylphenylthio, 3-trifluoromethylphenylthio, 2-pyridylthio, 1-naphthylthio, 2-naphthylthio, 4-propylcyclohexyl-4'-biphenylthio, 4-butylcyclohexyl-4'-biphenylthio, 4-pentylcyclohexyl-4'-biphenylthio, 4-propylphenyl-2-ethynyl-4'-biphenylthio), a heteroarylthio group having 1 to 80 carbon atoms, more preferably 1 to 40 carbon atoms, and further preferably 1 to 30 carbon atoms (for example, 2-pyridylthio, 3-pyridylthio, 4-pyridylthio, 2-quinolylthio, 2-furylthio, 2-pyrrolylthio), a substituted or unsubstituted alkylthio groups (for example, methylthio, ethylthio, butylthio, phenethylthio), a substituted or unsubstituted amino group (for example, amino, methylamino, dimethylamino, benzylamino, anilino, diphenylamino, 4-methyphenylamino, 4-ethylphenylamino, 3-n-propylphenylamino, 4-n-propylphenylamino, 3-n-butylphenylamino, 4-n-butylphenylamino, 3-n-pentylphenylamino, 4-n-pentylphenylamino, 3-trifluoromethyphenylamino, 4-trifluoromethylphenylamino, 2-pyridylamino, 3-pyridylamino, 2-thiazolylamino, 2-oxazolylamino, N,N-methylphenylamino, N,N-ethylphenylamino), a halogen atom (for example, fluorine atom, chlorine atom), a substituted or unsubstituted alkyl group (for example, methyl, trifluoromethyl), a substituted or unsubstituted alkoxy group (for example, methoxy, trifluoromethoxy), a substituted or unsubstituted aryl group (for example, phenyl), a substituted or unsubstituted heteroaryl group (for example, 2-pyridyl), a substituted or unsubstituted aryloxy group (for example, phenoxy), a substituted or unsubstituted heteroaryloxy group (for example, 3-thienyloxy), and the like.

$R^1$, $R^2$, $R^3$, $R^4$, $R^5$, $R^6$, $R^7$, and $R^8$ are preferably hydrogen atom, fluorine atom, chlorine atom, and a substituted or unsubstituted arytlthio group, alkylthio group, amino group, alkylamino group, arylamino group, alkyl group, aryl group, alkoxy group, or aryloxy group, and particularly preferably hydrogen atom, fluorine atom, and a substituted or unsubstituted arylthio group, alkylthio group, amino group, alkylamino group, or arylamino group.

Moreover, in the formula (2), at least one of $R^1$, $R^4$, $R^5$, and $R^8$ is further preferably $-(Het)_j-\{(B^1)_p-(Q^1)_q-(B^2)_r\}_n-C^1$.

In the formula (3), the substituents represented by $R^{11}$, $R^{12}$, $R^{13}$, $R^{14}$, $R^{15}$, $R^{16}$, and $R^{17}$ are a halogen atom, an alkyl group, an aryl group, an alkylthio group, an arylthio group, a heterothio group, a hydroxyl group, an alkoxy group, an aryloxy group, a carbamoyl group, an acyl group, an aryloxycarbonyl group, an alkoxycarbonyl group, and an amido group, and particularly preferably hydrogen atom, a halogen atoms, an alkyl group, an arylthio group, and an amido group.

$R^{16}$ is preferably an amino group (include an alkylamino group and an arylamino group), a hydroxyl group, a mercapto group, an alkylthio group, an arylthio group, an alkoxy group, or an aryloxy group, and particularly preferably an amino group.

Specific examples of the dichroic dyes which can be used in the present invention will be shown below, but the present invention should not be limited at all by the following specific examples.

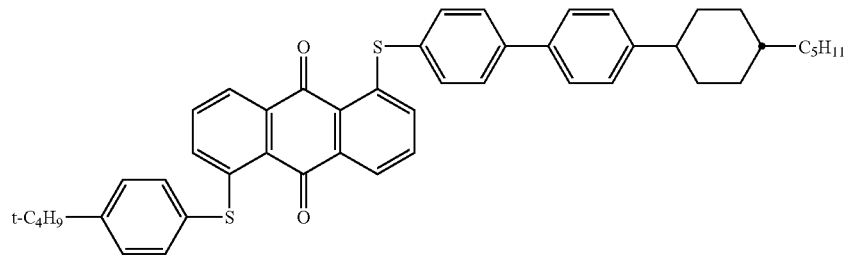

No. 1-1

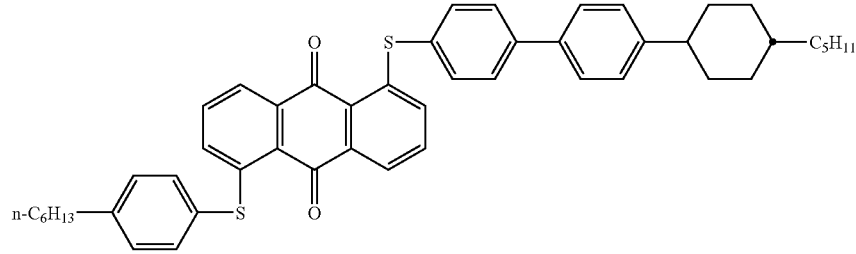

No. 1-2

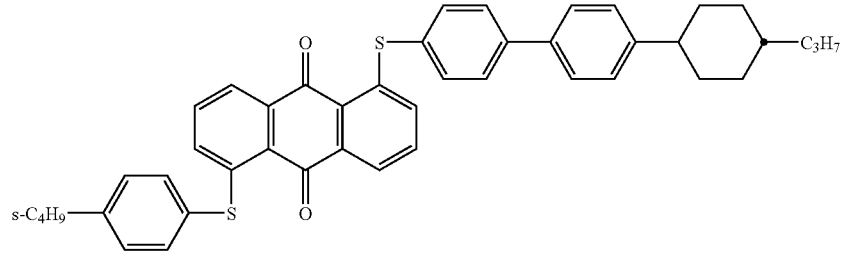

No. 1-3

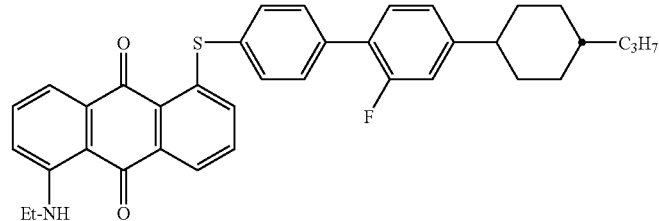

No. 1-4

-continued
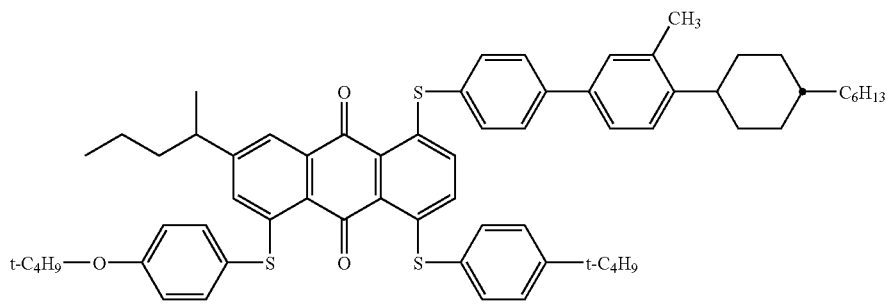
No. 1-5
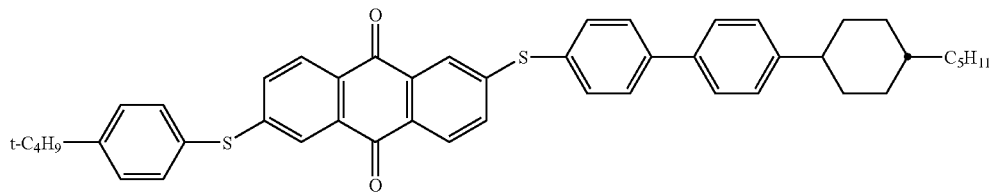
No. 1-6
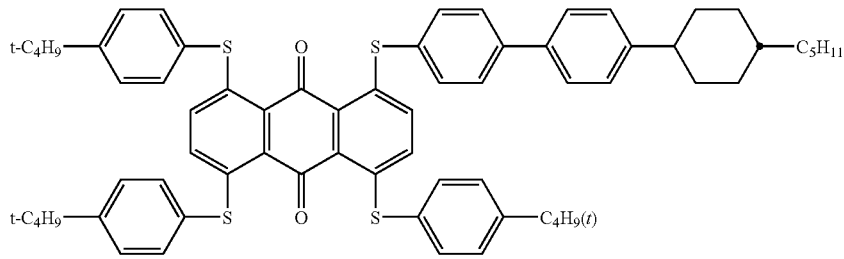
No. 1-7
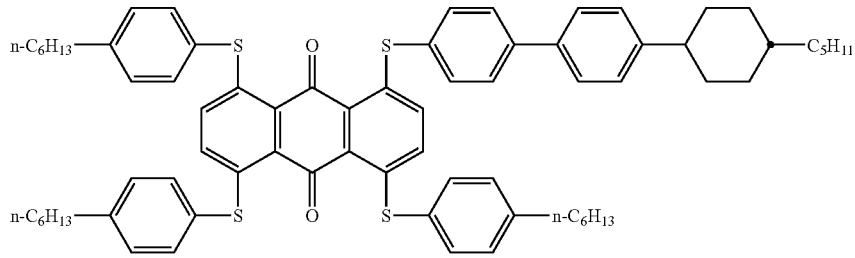
No. 1-8
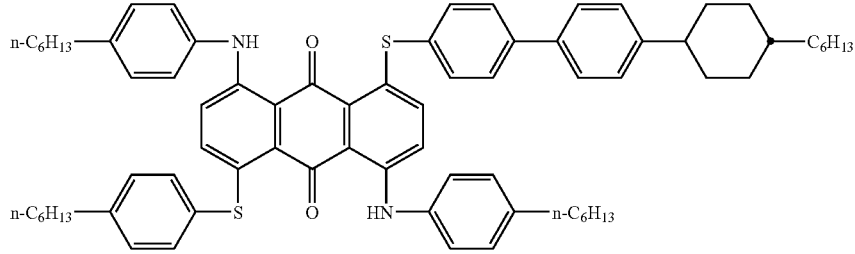
No. 1-9
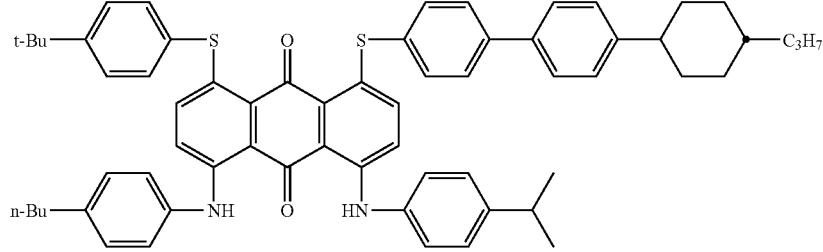
No. 1-10

-continued
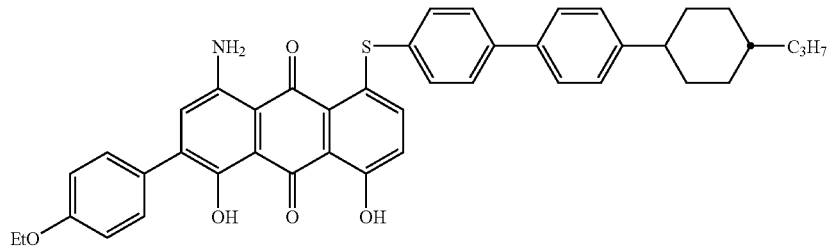
No. 1-11
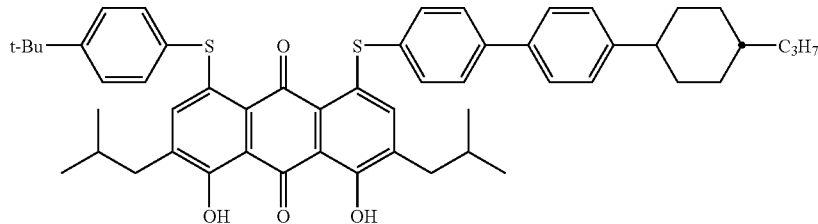
No. 1-12
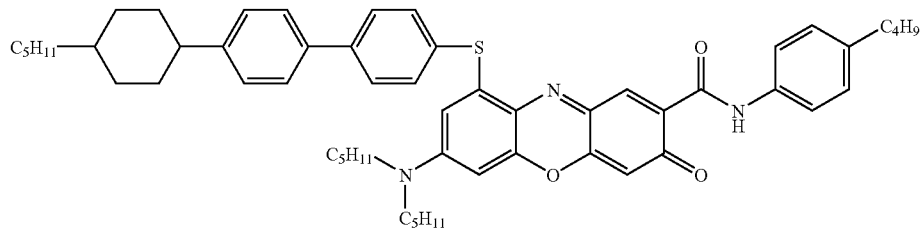
No. 1-13
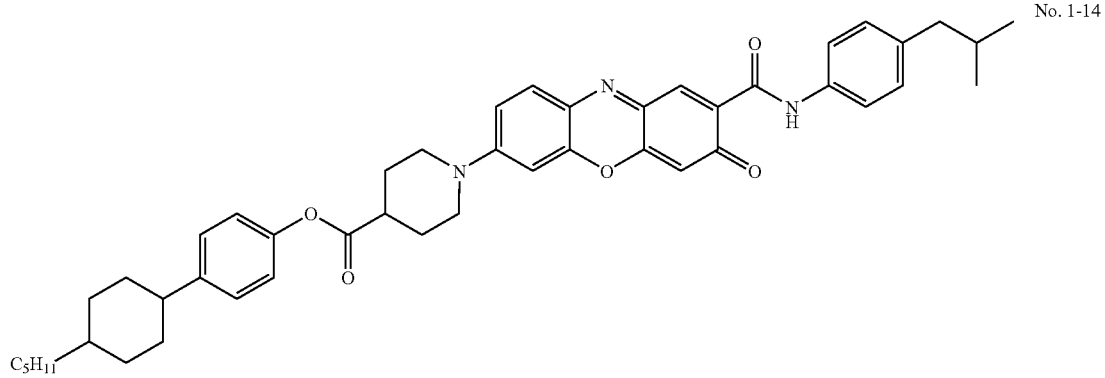
No. 1-14
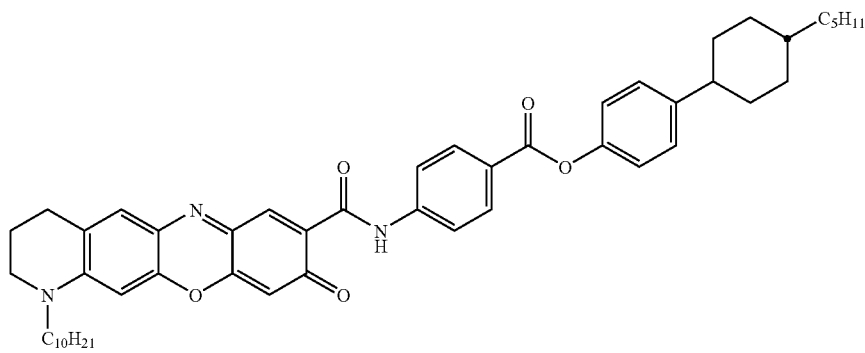
No. 1-15

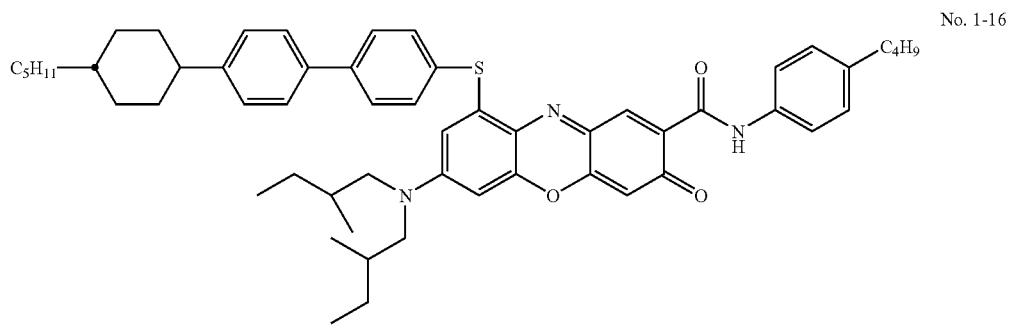

No. 1-16

Specific examples of the azo-based dichroic dyes are shown below but the present invention is not restricted to the following specific examples.

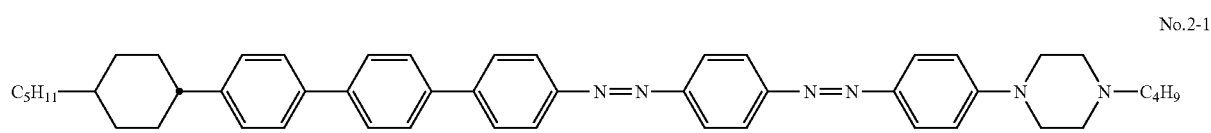

No. 2-1

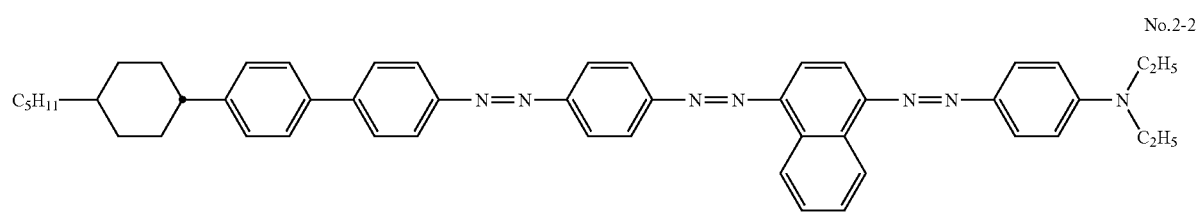

No. 2-2

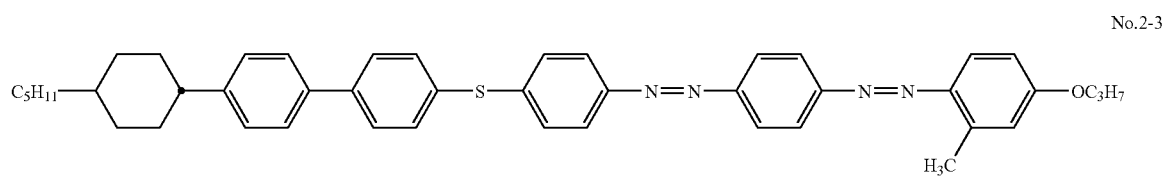

No. 2-3

Specific examples of the dioxadine type dichroic dyes and merocyanine type dichroic dyes usable in the present invention are shown below but the present invention is not restricted to the following specific examples.

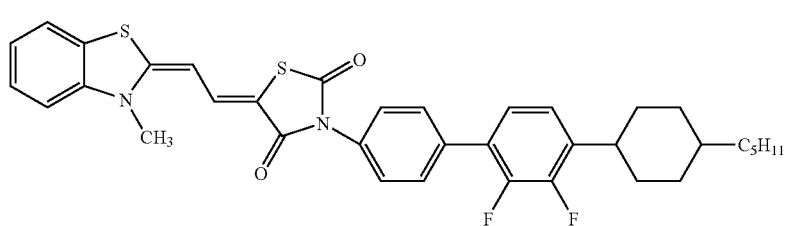

No. 3-1

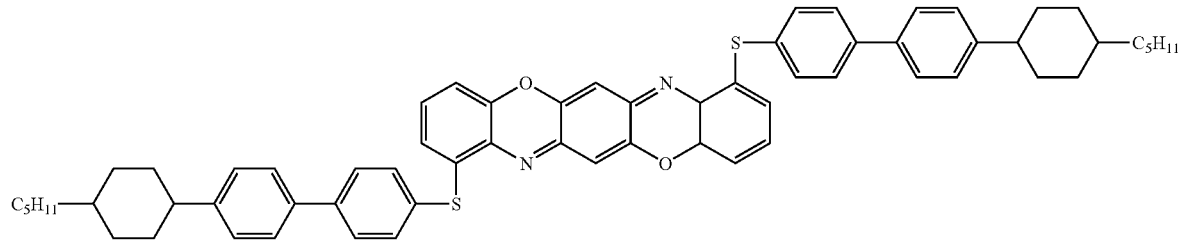

No.3-2

The dichroic dyes, which have substituents and are represented by the formula (1), can be synthesized by combining the known methods. For example, they can be synthesized according to the methods described in JP-A No. 2003-192664 and the like.

(The Host Liquid Crystal)

The host liquid crystal which can be used in the light modulating material of the present invention is defined as a compound having such a function that changes its aligned state by the action of the electric field to control the aligned state of the dichroic dye, which has been dissolved as a guest, represented by the formula (1).

While a host liquid crystal which can be used for the present invention is not particularly restricted as far as it can coexist with a dichroic dye, liquid crystal compounds which exhibit the nematic phase can be used. In case of the nematic liquid crystal, the voltage necessary for changing the sequence state is low, as compared with the cholesteric liquid crystal and the smectic liquid crystal. In addition, when being combined with a chiral reagent, there are such advantages for the nematic liquid crystal that the helical structure is formed easily and the display performance improves.

Specific examples of nematic liquid crystal compounds include azomethine compounds, cyanobiphenyl compounds, cyanophenyl esters, fluorine substituted phenyl ester, phenyl cyclohexanecarboxylate ester, fluorine substituted phenyl cyclohexanecarboxylate ester, cyanophenylcyclohexane, fluorine substituted phenylcyclohexane, cyano substituted phenylpyridine, fluorine substituted phenylpyridine, alkoxy substituted phenylpyridine, fluorine substituted and alkoxy substituted phenylpyridine, phenyldioxane, tolan-based compounds, fluorine substituted tolan-based compounds, and alkenylcyclohexyl benzonitrile. Liquid crystal compounds described in the pages of 154 to 192 and 715 to 722 of "Liquid crystal device handbook" (edited by the 142nd Committee in Japan Society for the Promotion of Science, Nikkan Kogyo Shimbun, Ltd., 1989) can be used as reference. For example, liquid crystals of Merck & Co., Inc. (ZLI-4692, MLC-6267, 6284, 6287, 6288, 6406, 6422, 6423, 6425, 6435, 6437, 7700, 7800, 9000, 9100, 9200, 9300, 10000, and the like), liquid crystals of Chisso Co., ltd. (LIXON5036xx, 5037xx, 5039xx, 5040xx, 5041xx, and the like), and the liquid crystal of Asahi Denka Kogyo K.K. (HA-11757) are enumerated.

The dielectric constant anisotropy of a host liquid crystal used in the present invention may be positive or negative. When a host liquid crystal having positive dielectric constant anisotropy is used, it is preferably used by combining with an alignment film to the horizontal direction, and when a host liquid crystal having negative dielectric constant anisotropy is used, it is preferably used by combining with an alignment film to the vertical direction.

In case of making a host liquid crystal align to the horizontal direction by applying the principles of an alignment film, dual frequency addressing, and the like, because the liquid crystal molecule is aligned to the horizontal direction, the dichroic dye also follows to be aligned to the horizontal direction. The dichroic dye related to the present invention is a positive dichroic dye, therefore light is absorbed in this state. On the other hand, a dichoic dye also becomes vertical in the state where the liquid crystal molecule is aligned to vertical direction. In the present invention in which a positive dichroic dye is used, light is passed in this state.

In this case, the light modulating material of the present invention can be driven by switching between no-voltage application state and a voltage application state.

To make a liquid crystal with negative permittivity anisotropy, it is necessary to make a structure so that a permittivity anisotropy of the minor axis of the liquid crystal molecule increases. For example, those described in the pages 4 to 9 of "Monthly Display" (the April number, 2000) and in the pages 389 to 396 of Syn Lett., vol. 4, 1999 are enumerated. For example, liquid crystals (ZLI-2806 and the like) of Merck & Co., Inc. are enumerated. Among these, a liquid crystal which has a fluorine substituent and has a negative of permittivity anisotropy is preferable from the viewpoint of the voltage retention. For example, liquid crystals (MLC-6608, 6609, 6610, and the like) of Merck & Co., Inc. can be enumerated.

In addition, the light modulating material of the present invention can also use a liquid crystal exhibiting a dual wavelength addressing property. A dual frequency addressable liquid crystal is a liquid crystal, which exhibits positive permittivity anisotropy when the frequency of the electric field applied to the liquid crystal is a low frequency area, and the permittivity anisotropy reverses negative when the frequency of the electric field applied to the liquid crystal is a high frequency area. It is detailed in the pages of 189 to 192 in Liquid crystal device handbook, edited by the 142nd committee in Japan Society for the Promotion of Science the Nikkan Kogyo Shimbun Ltd., 1989. As the specific example, the dual frequency addressable liquid crystal manufactured by Sigma-Aldrich Corp. will be shown.

Liquid Crystal 1 for Dual Frequency Addressing

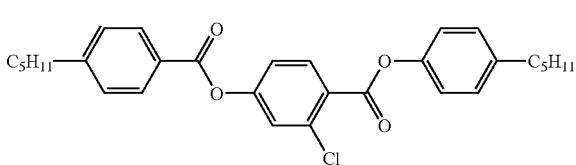

-continued

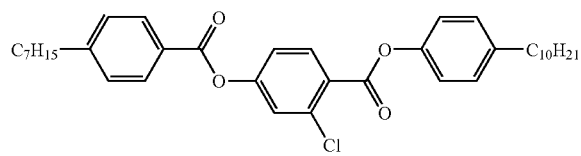

Commercially available dual frequency addressable liquid crystal materials include DF-02XX, DF-05XX, FX-1001, and FX-1002 manufactured by Chisso Co., Ltd., and MLC-2048 manufactured by Merck & Co., Inc.

Specific skeletons include azomethine compounds, cyanobiphenyl compounds, cyanophenyl esters, fluorine substituted phenyl esters, cyclohexane carboxylic acid phenyl esters, fluorine substituted cyclohexane carboxylic acid phenyl esters, cyanophenylcyclohexane, fluorine substituted phenylcyclohexane, cyano substituted phenylpyrimidine, fluorine substituted phenylpyrimidine, alkoxy substituted phenylpyrimidine, fluorine substituted and alkoxy substituted phenylpyrimidine, phenyldioxane, tolan-based compounds, fluorine substituted tolan-based compounds, an alkenylcyclohexyl benzonitrile.

When a dual frequency addressable liquid crystal is used, the liquid crystal driving is carried out by applying voltage under switching the different frequencies, which are low frequency and high frequency, on the light modulating material of the present invention.

The dual frequency addressable liquid crystal used in the present invention may be a mixture of plural liquid crystal compounds. Furthermore, the dual frequency addressable liquid crystal may be contained such a liquid crystal compound that does not reverse the sign of permittivity anisotropy in the low frequency area and the high frequency area in the applied electric field.

The frequency area in the electric field applied to the liquid crystal is preferably in a range of 0.1 Hz to 10 MHz, and more preferably in a range of 1 Hz to 1 MHz. The electric field used as a low frequency area is in a range of 0.1 Hz to 100 kHz, preferably in a range of 1 Hz to 10 kHz, and more preferably in a range of 10 Hz to 10 kHz. The electric field used as a high frequency area is in a range of 100 Hz to 10 MHz, preferably in a range of 100 Hz to 1 MHz, and more preferably in a range of 1 kHz to 1 MkHz.

Further, in case of switching a transparent and colored state and a transparent and colorless state, the host liquid crystal used in the present invention has preferably small absolute value of a refractive index anisotropy ($\Delta n$), and in case of switching a scattered and colored state and a transparent and colorless state, the host liquid crystal has preferably large absolute value of a refractive index anisotropy ($\Delta n$). Refractive index anisotropy ($\Delta n$) herein is defined as the difference between the refractive index ($n\parallel$) in the major axis direction of the liquid crystal molecule and the refractive index ($n\perp$) in the minor axis direction of the liquid crystal molecule.

$$\Delta n = n\parallel - n\perp$$

When the phase transition method is used as a method to switch a transparent and colored state and a transparent and colorless state, a liquid crystal has the small absolute value of $\Delta n$, and preferably $\Delta n=0.1$ or less. It is because the waving guide in the helical structure is controlled to decrease optical leakage when $\Delta n$ is small, resulting in the improvement in the light modulating property.

On the other hand, when the phase transition method is used as a method to switch a scattered and colored state and a transparent and colorless state, a liquid crystal has the large absolute value of $\Delta n$, and preferably $\Delta n=0.1$ or more, and more preferably $\Delta n=0.12$ or more. It is because that in the scattered state based on the random focal conic state, the larger the $\Delta n$ of the host liquid crystal, the higher the scattered strength, resulting in the improvement in the light modulating property.

While the content of a host liquid crystal and a dichroic dye are not particularly restricted in the light modulating material of the present invention, the content of the dichroic dye is preferably 0.1 to 15% by mass based on the content of the host liquid crystal, more preferably 0.5 to 10% by mass, and further preferably 1 to 8% by mass. Moreover, as for the content of the host liquid crystal and the dichroic dye, it is desirable that the liquid crystal composition including both materials is made, and the absorption spectrums of the liquid crystal cell which encloses the liquid crystal composition are measured respectively, and the dye density is decided which is necessary to provide the desired optical density as a liquid crystal cell.

(Other Additives)

In the light modulating material of the present invention, a compound which does not exhibit the liquid crystallinity may be added for the purpose of changing the physical properties of the host liquid crystal within the desired range (for instance, for the purpose of making the temperature range of the liquid crystallinity within the desired range). Moreover, compounds including a chiral compound, an ultraviolet absorbent, and an antioxidant may be contained. Such additives include, for example, chiral reagents for TN and STN, which are described in the pages of 199 to 202 of "Liquid crystal device handbook" (edited by the 142nd Committee in Japan Society for the Promotion of Science, Nikkan Kogyo Shimbun, Ltd., 1989). When a chiral reagent is added, the cholesteric liquid crystal phase is formed, and the dichroic dye, which is dissolved in the nematic liquid crystal, will be spirally arranged. Therefore, it is suitable because both polarized lights can be absorbed for linear polarized lights being orthogonal to each other, and the absorbed amount of light in the colored state is increased On the other hand, when the nematic liquid crystal layer which has been made in uniaxial alignment is used, as for tight, only half theoretical will be absorbed.

The amount of the chiral reagent added is preferably 0.5 to 30% by mass in the liquid crystal composition, more preferably 0.5 to 20% by mass, and further preferably 1 to 10% by mass. When the chiral reagent is more than 30% by mass, the selective reflection might be shown in the visible range to decrease the light modulating performance, or it might be easy for the chiral reagent to separate out from the host liquid crystal. The chiral reagents may be used in combination of two or more. A combination of the chiral reagents having positive and negative with regard to the temperature dependency of the chiral pitch to decrease the temperature dependency of the chiral pitch is preferable.

Specific examples of the chiral reagents used in the present invention will be shown below.

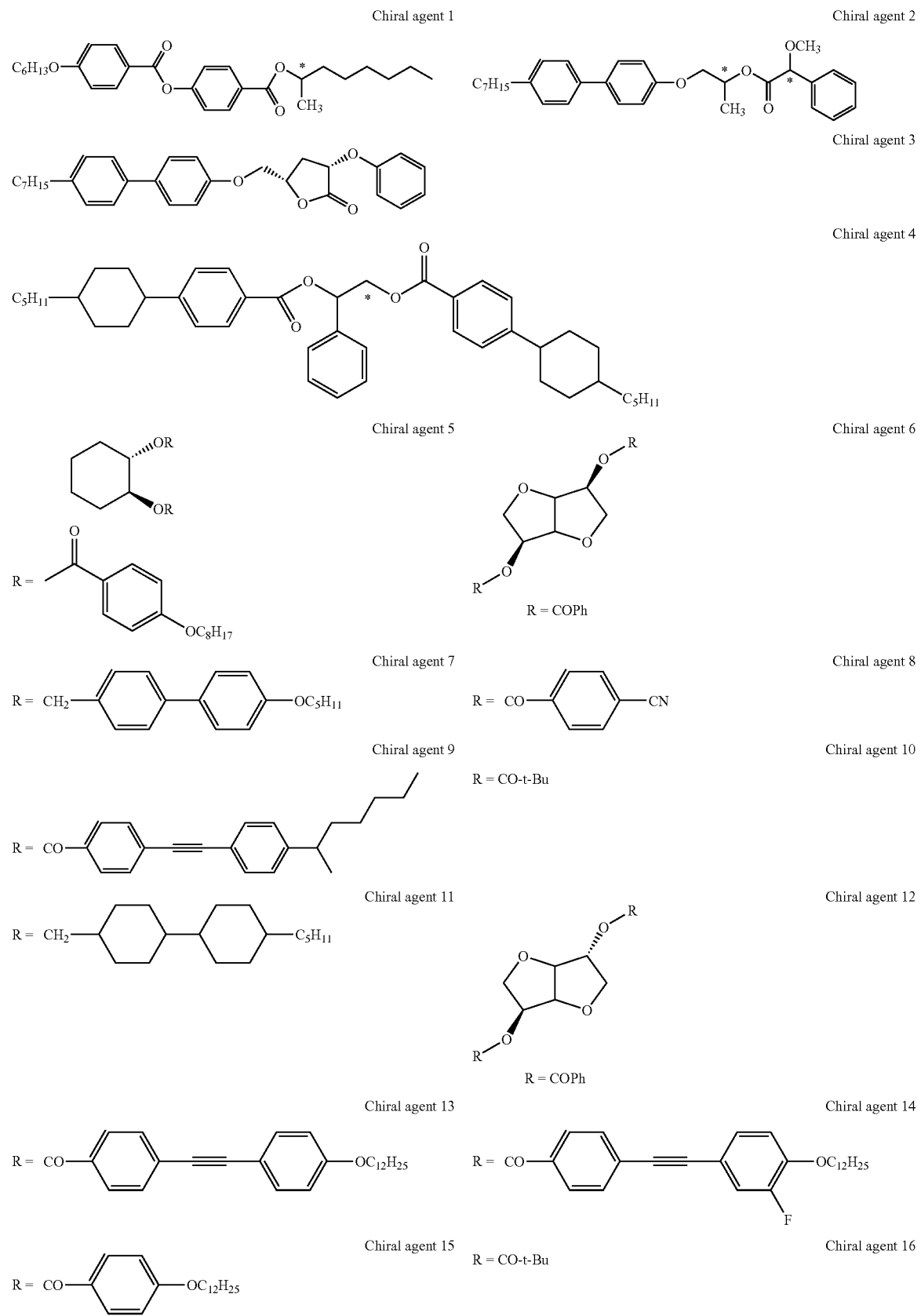

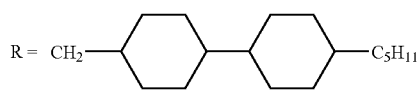

As for the light modulating performance in the light modulating material of the present invention, the ratio ($T_0/T$), of the light transmittance $T_0$ in the transparent state to the light transmittance T in the colored state, is preferably in a range of 3 to 1000, further preferably in a range of 5 to 1000, and particularly preferably in a range of 8 to 1000.

The liquid crystal composition used for the light modulating material of the present invention may be made to coexist with a polymer. When the light modulating material of the present invention is a method of switching the scattered and colored state and a transparent and colorless state, the light modulating material is preferable to be made to coexist with a polymer.

The polymer medium layer, which disperses and contains the liquid crystal composition used for the light modulating material of the present invention, can be formed, for example, by applying the polymer solution which has dispersed the liquid crystal composition on the substrate. As for the method of dispersing the liquid crystal composition in the polymer solution, the dispersion can be done by using such means as mechanical stirring, heating, supersonic wave, or the combination.

In the polymer medium layer, the mass ratio of the liquid crystal composition dispersed in the polymer medium and the polymer medium is preferably 1:10 to 10:1 and more preferably 1:1 to 8:2.

As the method of forming the polymer medium layer, such methods are preferable that the solution dissolving the polymer and the liquid crystal composition is applied on the substrate, or that a crystal composition liquid and a polymer liquid, which are dissolved in a common solvent, are applied on the substrate, and then the solvent is evaporated.

The polymer used for the polymer medium layer is not particularly restricted. Polymers used include water-soluble polymers such as siloxane polymer, methyl cellulose, polyvinyl alcohol, polyoxyethylene, polyvinyl butyral, and gelatin; polyacrylates, polymethacrylates; polyamides; polyesters; polycarbonates; polyvinyl alcohol derivatives as typified by vinyl acetate and polyvinyl butyral; cellulose derivatives like triacetyl cellulose; and non-water soluble polymer such as polyurethanes and polystyrenes.

As a polymer used for the light modulating material of the present invention, siloxane polymer, polyacrylates, and polymethacrylates are preferable from the viewpoint of high miscibility with the host liquid crystal.

Specific examples of the siloxane polymers of the present invention will be shown below, but the present invention should not be limited to them.

No. 1

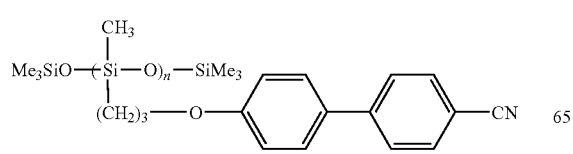

Chiral agent 17

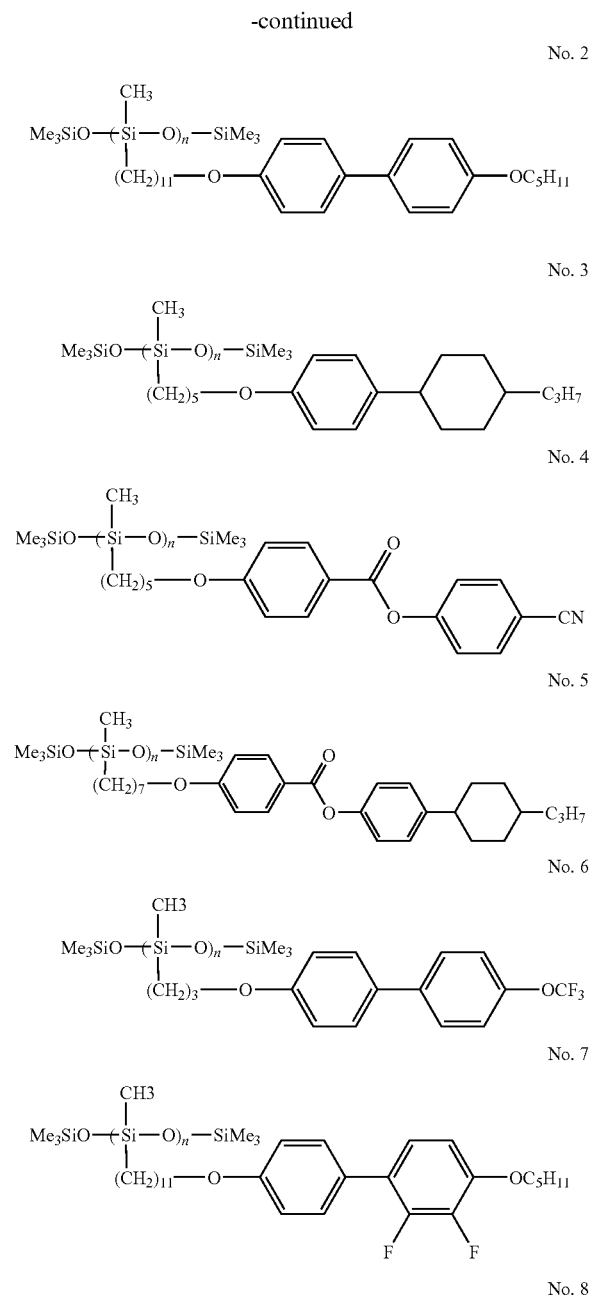

No. 8

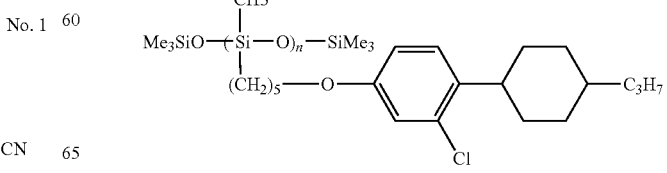

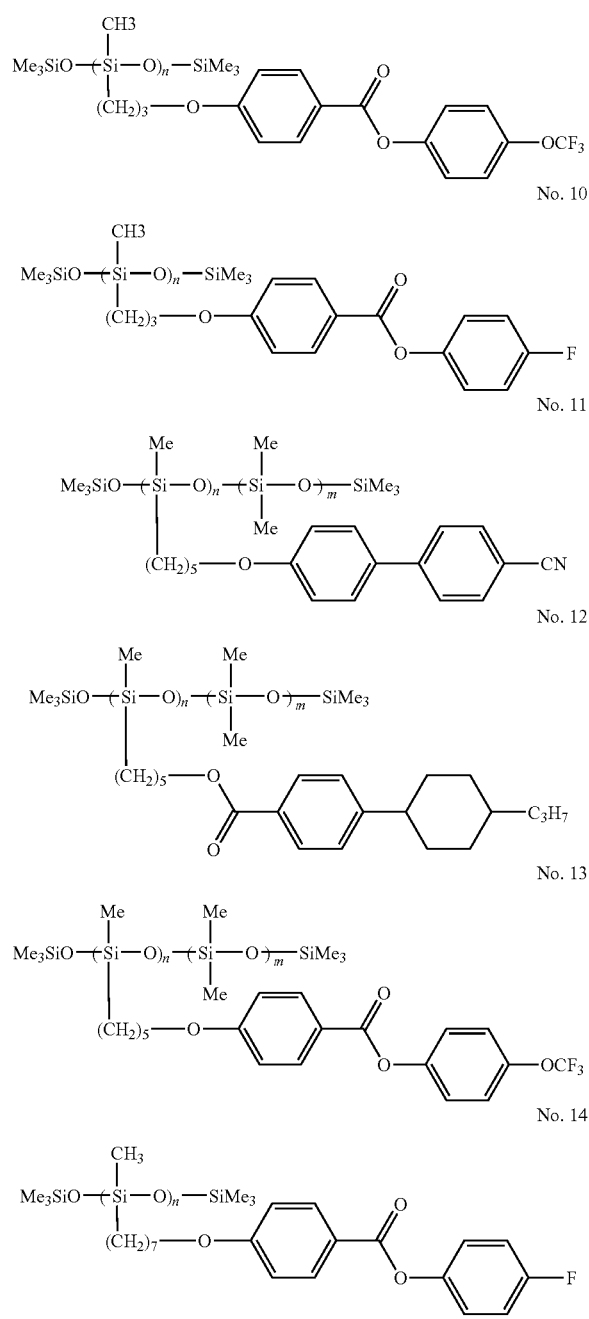

Further, the surfactant can be used in the polymer medium for the purpose of stabilizing the dispersion of the liquid crystal composition. While the surfactant which can be used in the present invention is not particularly restricted, nonionic surfactants are preferable, and sorbitan fatty acid esters, polyoxyethylene fatty acid esters, olyoxyethylene alkyl eters, fluoroalkylethylene oxides, and the like can be used.

Especially, because the dichroic dye related to the present invention has a substituent represented by the formula (1), when a polymer having an aromatic group is used as a polymer, the miscibility of the dichroic dye with the polymer rises, and the light modulating performance can be improved.

In the light modulating material of the present invention, the thickness of the polymer medium layer is preferably 1 to 50 μm, more preferably 2 to 40 μm, and further preferably 5 to 30 μm.

In the light modulating material, while the amount of the dichroic dye added is preferably large from the viewpoint of improving the light modulating performance, in the other hand, when the polymerization-induced phase separation method, which is easily rose scattering intensity rises easily, is applied as a method of adjusting a polymer dispersion type liquid crystal, the polymerization temperature is preferably lower than room temperature from the viewpoint of suppressing the decomposition of the dichroic dye owing to the radical species at the time of the polymerization. Moreover, low reactivity caused by radical species has an effect of controlling the decomposition of the dichroic dye, so that methacrylate monomers are preferably used from the viewpoint. Moreover, when the photopolymerization is used, UV irradiation strength is preferably reduced from the viewpoint of controlling the decomposition of the dichroic dye at the time of UV irradiation, for instance, the range of 1 to 500 mW/cm$^2$ is preferable, and the range of 1 to 50 mW/cm$^2$ is further preferable.

When such a method is applied that a polymer and a liquid crystal composition are mixed beforehand and then the phase separation is conducted, as the polymer to be applied, a polymer having no aromatic group is preferable from the viewpoint of decreasing the dyeing of the dichroic dye, for instance, polyacrylate, polymethacrylate, polyvinyl alcohol, gelatin, polyimide, and the like are preferable.

These measures are suitable because they can increase the light transmittance in the transparent state.

Moreover, it is suitable to adjust the addition concentration of the chiral reagent so that the selective reflection zone comes to the near-infrared region, because a spiral frequency increases to raise the light absorption ratio with the dichroic dye, and coloring in the colored state becomes excellent.

In addition, in the light modulating material of the present invention, plural dichroic dyes may be mixed in one liquid crystal layer. As for the color presented, it may be any one.

Moreover, the liquid crystal layers where each color is presented may be separately made and laminated. Furthermore, the liquid crystal layers (liquid crystal parts) where each color is presented may be arranged side by side.

<The Constitution of the Light Modulating Material>
(The Basic Structure)

The light modulating material has the liquid crystal layer which contains at lest a host liquid crystal and a dichroic dye. Therefore, it may be a mode in which the liquid crystal layer exists only between a couple of supports, and may be a mode (light modulating element) in which the liquid crystal layer exists between a couple of electrode substrates and the light modulating state is electrically controlled. The support and the substrate are preferably transparent.

(Each Constitutional Member)
-Electrode Substrate-

As an electrode substrate, the one that the electrode layer is formed on the substrate (support), which is usually comprised of glass or plastic (polymer), can be used. A plastic substrate is preferable. Acrylic resin, polycarbonate resin, epoxy resin, PES or PEN, and the like are enumerated as a plastic substrate. As for the substrate, those described in the pages of 218 to 231 of "Liquid crystal device handbook" (edited by the 142nd Committee in Japan Society for the Promotion of Science, Nikkan Kogyo Shimbun, Ltd., 1989) can be used. An electrode layer formed on the substrate is preferably a transparent electrode layer. For example, the layer can be formed from indium oxide, ITO (indium tin oxide), tin oxide, and the like. Among them, indium tin oxide (ITO) is suitable to be used in terms of having high transparency and low resistance.

As for a transparent electrode, those described in the pages of 232 to 239 of "Liquid crystal device handbook" (edited by the 142nd Committee in Japan Society for the Promotion of Science, Nikkan Kogyo Shimbun, Ltd., 1989) are used.

-Spacer-

The light modulating material of the present invention can be manufactured in such a way that, for instance, a couple of substrates are opposed at a 1 to 50 μm interval with a spacer and the like, and a liquid crystal composition is arranged in the space formed between substrates. As for a spacer, those described in the pages of 257 to 262 of "Liquid crystal device handbook" (edited by the 142nd Committee in Japan Society for the Promotion of Science, Nikkan Kogyo Shimbun, Ltd., 1989) can be used. The light modulating material of the present invention can be arranged in the space between substrates by applying or printing on the substrate.

In case of the light modulating material of the present invention, the thickness of the liquid crystal layer, that is, the interval between substrates formed with the spacer is preferably 1 to 50 μm and more preferably 2 to 40 μm. When the interval is thicker than 50 μm, it is not preferable because it becomes easy to decrease transmittance in the transparent state, and when thinner than 1 μm, it is also not preferable because it becomes easy to cause an irregular display by energization owing to a partial defect.

-Other Members-

Other members include, for instance, a barrier film, an ultraviolet absorption layer, an antireflection layer, a hard court layer, a fouling prevention layer, an insulating film between organic layers, a metallic reflecting plate, a phase difference plate, and an alignment film. One kind of them may be used alone, or two or more kinds of them may be used in combination.

The barrier film is suitable to obstruct the passage of water and/or oxygen in the light modulating material. Any film of organic polymer-based compounds, inorganic compounds, and organic-inorganic complexes is acceptable as the barrier film. The organic polymers include ethylene-vinyl alcohol (EVOH), polyvinyl alcohol (PVA/PVOH), nylon MXD6 (N-MXD), and nano-composite-based nylons. The inorganic compounds include silica, alumina, and binary systems. The details have been described in, for example, "Development of high barrier materials, film forming technology, and barrier property measurement and evaluation method" (Technical Information Institute Co., Ltd., 2004).

In the light modulating material of the present invention, it is preferable to place the barrier layer on the surface of the support where a transparent electrode is not placed from the viewpoint of easiness of manufacturing.

In the present invention, it is preferable to install the ultraviolet absorption layer to prevent the deterioration of the light modulating material because of the ultraviolet rays.

The ultraviolet absorption layer is preferable to contain an antioxidant such as 2,2-thiobis(4-methyl-6-t-butylphenol) and 2,6-di-t-butylphenol, and an ultraviolet absorbent such as 2-(3-t-butyl-5-methyl-2-hydroxyphenyl)-5-chlorobenzotriazole and alkoxybenzophenone.

In the light modulating material of the present invention, it is preferable to place the ultraviolet absorption layer on the surface of the support where a transparent electrode is not placed from the viewpoint of easiness of manufacturing. Moreover, while it may be installed on both sides of two opposed supports, and it may be installed on only one side, being installed at least on the support in the incidence side of light is preferable so that the ultraviolet absorption layer may exert its function.

Moreover, it is preferable to suppress the reflection of incident light on the surface of the glare proof mirror, and to install an antireflection film so that sufficient incidence of light will be given to the glare proof mirror.

The antireflection film is formed by using an inorganic material or an organic material, and the film constitution may be a single layer or may be a multilayer. In addition, it may be an inorganic-organic composite film in which the multilayer structure is made with the film of an inorganic material and the film of an organic material. The antireflection film can be installed on one side or both sides of the light modulating material. When being installed on both sides, the antireflection films on both sides may have the same constitution, and may have different constitution, respectively. For example, it is also possible to make the antireflection film on one side a multilayer structure, and to simplify the antireflection film on the other side to a single layer structure. Moreover, the antireflection film can be installed directly on a transparent electrode or on the support.

Inorganic materials used for the antireflection film include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$. These can be used alone or using two or more kinds in combination. Among these materials, it is preferable to use $SiO_2$, $ZrO_2$, $TiO_2$, and $Ta_2O_5$ that vacuum deposition is possible at low temperature, because the support is preferably made of plastic.

As a multilayer film formed with inorganic materials, the laminated structure where the high refractive index material layer and the low refractive index material layer are formed alternately from the support side is illustrated, that is, from the support side, the total optical film thickness of the $ZrO_2$ layer and the $SiO_2$ layer is $\lambda/4$, the optical film thickness of the $ZrO_2$ layer is $\lambda/4$, and the optical film thickness of the $SiO_2$ layer, the most surface layer, is $\lambda/4$. Herein, $\lambda$ is the design wavelength, and usually 520 nm is used. The most surface layer is preferably $SiO_2$ because it has a low refractive index and can give mechanical strength to the antireflection film.

When the antireflection film is formed with an inorganic material, the film forming method can adopt, for example, a vacuum deposition method, an ion plating method, a sputtering method, a CVD method, a precipitating method in saturated solution by chemical reaction, and the like.

Organic materials used for the antireflection film include, for example, FFP (tetrafluoroethylene-hexafluoropropylene copolymer), PTFE (polytetrafluoroethylene), and ETFE (ethylene-tetrafluoroethylene copolymer), and selected in consideration of the refractive index of the support material and the hard court film (when present). As for the film forming method, besides a vacuum deposition method, the film can be formed by the use of painting methods such as a spin coating method and a dip coating method that are excellent in mass production.

As a hard court layer, well-known ultraviolet curing or electron beams curing acrylic-based resins or epoxy-based resins can be used.

As a fouling prevention layer, water-repellent and oil-repellent materials like a fluorine-containing organic polymer can be used.

As an alignment film, it is preferable to use polyimide, a silane coupling agent, polyvinyl alcohol, gelatin, and the like, and it is preferable to use polyimide and a silane coupling agent in terms of the alignment ability, the durability, the insulation property, and the cost.

As for the alignment method, the rubbing may be processed or not processed. The aligned state may be either of the horizontal state or the vertical state.

<Applications>

Because being able to give a high light modulating performance, the light modulating material of the present invention can be suitably used as modulated light, security, an in-vehicle application, an interior design, an advertisement, and an information display panel.

EXAMPLES

The present invention will be described more specifically citing example as follows. Materials, reagents, the amount of substances and the ratio, operations and the like shown in the following examples can be properly changed as long as being not deviated from the purport of the present invention. Therefore, the range of the present invention should not be limited to the following specific examples.

Example 1

The Preparation of a Light Modulating Material

1. The Preparation of Dichroic Dyes and Liquid Crystals

Dichroic dyes (1-2) and (1-8) were synthesized according to the method discovered in JP-A No. 2003-192664. Dichroic dye (1-13) was synthesized according to the method discovered in JP-A No. 2005-120334. Host liquid crystal ZLI-1132 (a nematic liquid crystal. Δn=0.13) was purchased from Merck & Co., Inc. Chiral reagent R-1011 was purchased from Merck & Co., Inc.

2. The Preparation of Light Modulating Elements

A polyimide horizontal alignment film (manufactured by Nissan Chemical Industries, Ltd.) was attached on a glass substrate with ITO, which is a transparent electrode, by spin coating and burning. Next, the obtained glass substrate with the horizontal alignment film was subjected to rubbing processing.

Dichroic dyes shown in the following Table 1 and a chiral reagent (R-1011) were dissolved in 1.0 g of a host liquid crystal (ZLI-1132) in the combinations shown in Table 2 under heating to be a liquid crystal composition, and then the liquid crystal composition was let alone at room temperature for one day. The amount of each dichroic dye added was adjusted so that the transmittance became 20% when the liquid crystal composition was injected into the cell of 8 μm for the liquid crystal evaluation. In addition, a concentration of the chiral reagent in Table 2 is the concentration (% by mass) based on a total mass of the liquid crystal composition.

A small amount of spherical spacer of 16 μm (manufactured by Sekisui Chemical Co., Ltd.) was mixed with the obtained liquid crystal composition, and the liquid crystal composition thus produced was put between the glass substrates with ITO so that the alignment film sides might contact with the liquid crystal layer, and then sealed with a photocuring type sealing agent (manufactured by Sekisui Chemical Co., Ltd.).

TABLE 1

| Dichroic dye No. | Comment |
| --- | --- |
| 1-8 | Magenta dye |
| 1-13 | Cyan dye |
| 1-2 | Yellow dye |

3. Evaluation

The obtained light modulating material of the present invention was in a colored state when no voltage was applied. When voltage (100 V, 60 Hz) was applied with a signal generator (manufactured by Tektronix, Inc.), the liquid crystal layer became in the transparent and colorless state. Moreover, the UV/vis absorption spectrum measurement (UV2400, manufactured by Shimadzu Corporation) was carried out in the scattered and colored state and in the transparent and colorless state at the maximum absorption wavelength of the dichroic, dye, and transmittance in the scattered and colored state and in the transparent and colorless state was measured. The ratio ($T_0/T$) of the light transmittance $T_0$ in the transparent and colorless state to the light transmittance T in the colored state is shown in Table 2.

As shown in Table 2, the light modulating material of the present invention has been confirmed to have the function of being able to control the light transmittance electrically.

TABLE 2

| Sample No. | Dichroic Dye No. | Concentration of Chiral reagent (% by mass) | Ratio of Transmittance | Remarks |
| --- | --- | --- | --- | --- |
| A | 1-8 | 2 | 8.0 | The present invention |
| B | 1-8 | 4 | 9.5 | The present invention |
| C | 1-13 | 2 | 8.8 | The present invention |
| D | 1-2 | 2 | 9.0 | The present invention |
| E | Y-1 | 2 | 3.1 | Comparison |
| F | M-1 | 2 | 3.2 | Comparison |
| G | M-1 | 4 | 3.5 | Comparison |
| H | C-1 | 2 | 3.4 | Comparison |

Comparative Example 1

Light modulating materials were manufactured in the same way as Example 1, except for using yellow dye Y-1 magenta dye M-1, or cyan dye C-1 being shown below. Then, the materials were evaluated in the same way as Example 1, and the results were shown in Table 2.

As shown in Table 2, it was clarified that the ratio of the transmittance was lower and the light modulating function was lower in the light modulating elements of the comparison as compared than the light modulating elements of the present invention.

Comparison 1.

Conventional compounds described in Jpn. J. Appl. Phys. vol. 37, 3422 (1998)

Yellow compound Y-1

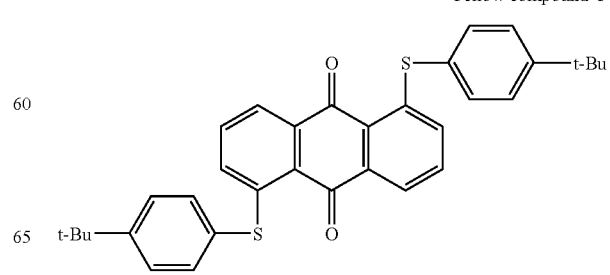

-continued

Magenta compound M-1

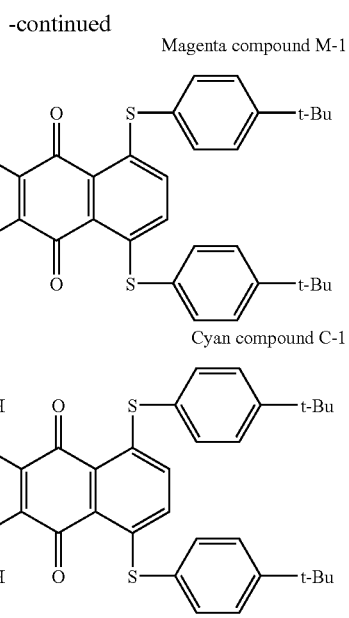

Cyan compound C-1

Example 2

The Preparation of a Light Modulating Material

1. The Manufacture of a Plastic Substrate

An undercoating layer and a back layer were prepared to PEN (Dupont-Teijin Q65A) in the same way as the manufacture of sample 110 in Example 1 of JP-A 2000-105445. That is, after 100 parts by weight of polyethylene-2,6-naphthalate polymer and 2 parts by weight of Tinuvin P. 326 (manufactured by Ciba-Geigy Corp.) as an ultraviolet absorbent were dried and then melted at 300° C., the melt was extruded from T-shaped die, and the extrusion was subjected to longitudinal drawing of 3.3 in draw ratio at 140° C. and then to transversal drawing of 3.3 in draw ratio at 130° C. and further subjected to heat setting at 250° C. for six seconds. Thus, a plastic substrate (PEN) of 90 µm in thickness of the present invention was obtained.

2. Preparation of a Transparent Electrode Layer

Conductive indium tin oxide (ITO) was coated to the one side of the plastic substrate obtained above, and uniform thin film of 200 nm in thickness was laminated. It was about 20 Ω/cm² in surface resistance and 85% in light transmittance (500 nm). Next, $SiO_2$ thin film (100 nm) was attached on the ITO surface by sputtering as an antireflection film. The light transmittance (500 nm) was 90%.

(The Preparation of a Liquid Crystal Layer)

The light modulating material used the support was prepared by the same operation as that in Example 1 as the present invention.

(The Attachment of a Barrier Layer)

Forming an Inorganic-Organic Hybrid Layer

Eight grams of Soanol D2908 (ethylene-vinyl alcohol copolymer, manufactured by Nippon Synthetic Chemical Industry Co., Ltd.) was dissolved in the mixture solution which include 118.8 g of 1-propanol and 73.2 g of water at 80° C. In 10.72 g of this solution, 2.4 ml of 2N hydrochloric acid was added and mixed. One gram of tetraethoxysilane was added dropwise while this solution was continuously stirred for 30 minutes. Next, the obtained coating liquid was coated on the support of the light modulating material with a wire bar. Then, the applied layer was dried at 120° C. for five minutes to form an organic-inorganic hybrid layer of about 1 µm in film thickness in the light modulating material.

(The Attachment of an Ultraviolet Absorption Layer)

After 42 g of water, 40 g of silanol modified polyvinyl alcohol (trade name: R2105, manufactured by Kuraray Co., Ltd.) and 13.5 g of an encapsulated liquid for an ultraviolet filter were mixed, 17 g of aqueous solution of 50% by mass 2-(3-t-butyl-5-methyl-2-hydroxyphenyl)-5-chlorobenzotriazole, 65 g of 20% by mass colloidal silica dispersion liquid (trade name: SNOWTEX O, manufactured by Nissan Chemical Industries, Ltd.), 2.5 g of polyoxyethylene alkyl ether phosphate (trade name: NEOSCORE CM57, manufactured by Toho Chemical Industry Co., Ltd.), and 2.5 g of polyethylene glycol dodecyl ether (trade name: EMULGEN 109P, manufactured by Kao Corporation) were added and an coating liquid for an ultraviolet filter layer was obtained.

Next, the obtained application liquid was coated on the barrier layer of the light modulating material with a wire bar. Then, the applied layer was dried at 120° C. for five minutes to form an ultraviolet absorption layer of about 1 µm in film thickness in the light modulating material.

Next, a light modulating material was prepared by the same operation as that in Example 1.

(The Evaluation of the Display Performance)

When the obtained light modulating material of the present invention was evaluated in the same way as that in Example 1, it was confirmed that modulated light with a high contrast ratio was possible.

In addition, as shown in FIG. 1, light modulating material 10 of the present invention was bonded on the inside of car windshield 20 by using a bonding agent, and it was confirmed that a scattered and colored state and a transparent and colorless state were switched electrically. That is, it was confirmed that the display element of the present invention carried out the same function as a sun visor.

Figure 2:
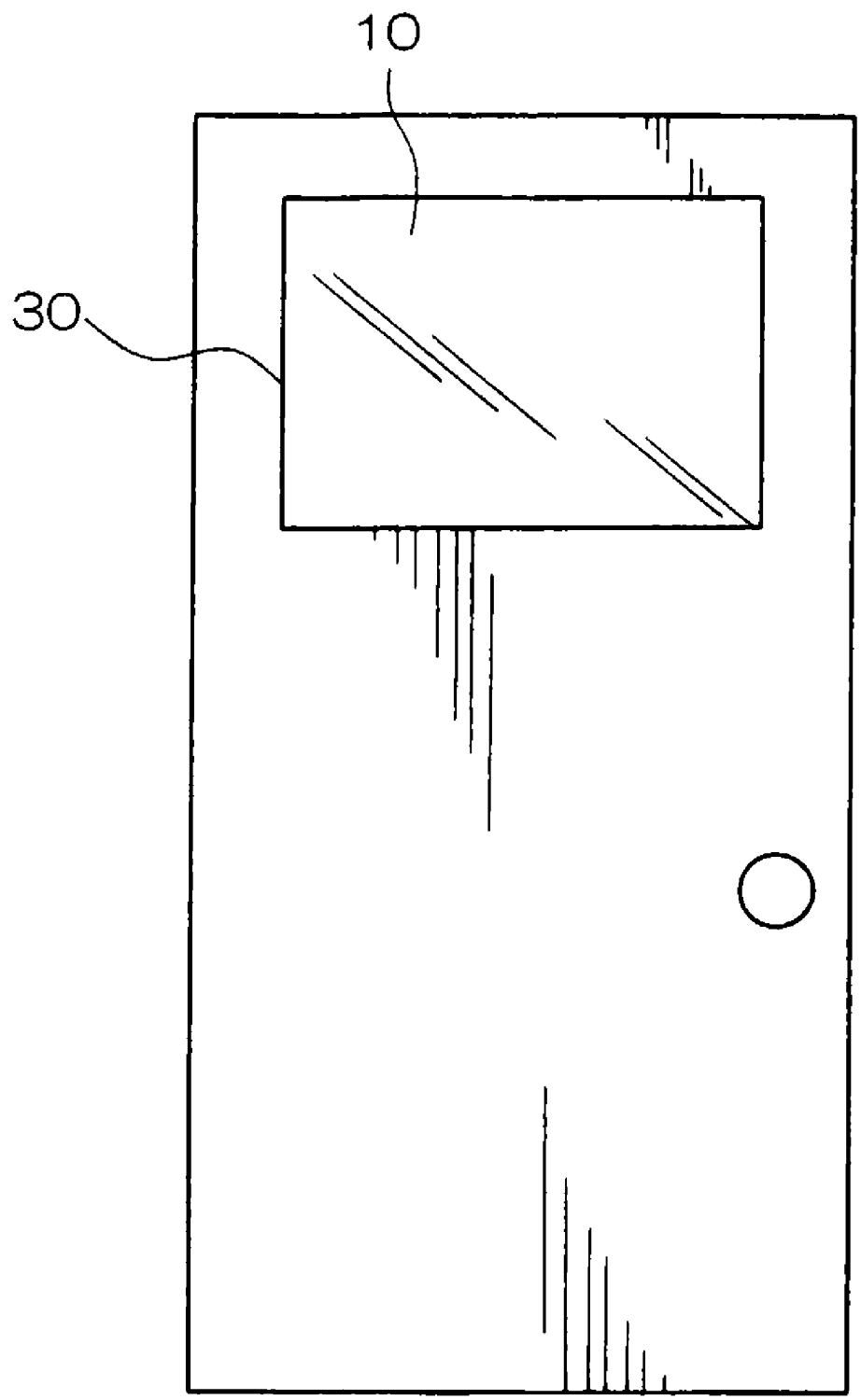
FIG. 2 shows the light modulating material of the present invention attached to the glass part of a door.

Moreover, as shown in FIG. 2, light modulating material 10 of the present invention was attached on glass part 30 in a door, and it was confirmed that a scattered and colored state and a transparent and colorless state were switched electrically. That is, it was confirmed that the display element of the present invention carried out the function as a door having the light modulating function.

Example 3

A light modulating material was prepared by the same method as that in Example 1, except that the host liquid crystal ZLI-1132 was changed to ZLI-2806 (a nematic liquid crystal, Δn=0.043, manufactured by Merck & Co., Inc.), the horizontal alignment film was changed to a polyimide vertical alignment film (manufactured by Nissan Chemical Industries, Ltd.), the kind of the chiral reagent and the addition amount were changed as described in the following Table 3, and the spacer was changed to a spacer of 8 µm in Example 1.

In Table 3, the concentration of the dye is the concentration (% by mass) based on the host liquid crystal, the amount of the chiral reagent shows the mass (% by mass) based on the total mass of the liquid crystal composition.

The light modulating material becomes to be in a transparent and colorless state when no voltage is applied, and to be in a colored state when a voltage is applied. When having been evaluated in the same way as that in Example 1, it was confirmed that the light modulating material of the present invention has a high light modulating function.

TABLE 3

| Sample No. | Dichroic Dye No. | Concentration of Dye (% by mass) | Chiral Reagent | Amount of Chiral Reagent (% by mass) | Ratio of Transmittance | Remarks |
|---|---|---|---|---|---|---|
| I | 1-8 | 1.0 | R811 | 1.0 | 4.6 | The present invention |
| J | 1-8 | 1.0 | R1011 | 0.5 | 4.2 | The present invention |
| K | 1-8 | 1.0 | R1011 | 1.0 | 4.8 | The present invention |
| L | 1-8 | 2.0 | R1011 | 1.0 | 6.8 | The present invention |
| M | 1-13 | 1.0 | R1011 | 1.0 | 4.6 | The present invention |
| N | 1-2 | 1.0 | R1011 | 1.0 | 4.9 | The present invention |
| O | 1-2 | 1.0 | No15 | 1.0 | 4.9 | The present invention |
| P | 1-2 | 1.0 | No15 + No16 (1:1) | 1.0 | 4.7 | The present invention |
| Q | Y-1 | 1.0 | R1011 | 1.0 | 1.8 | Comparison |
| R | M-1 | 1.0 | R1011 | 1.0 | 1.6 | Comparison |
| S | M-1 | 2.0 | R1011 | 1.0 | 2.0 | Comparison |
| T | M-1 | 1.0 | R1011 | 0.5 | 1.0 | Comparison |
| U | C-1 | 1.0 | R1011 | 1.0 | 1.9 | Comparison |

As a comparative example, a comparative light modulating material was prepared using the dye for comparison in Comparative example 1 by the same operation as that in Example 3, and the result was shown in Table 3. As shown in Table 3, it was clarified that the ratio of the transmittance was lower and the light modulating function was lower in the light modulating elements of the comparison as compared than the light modulating elements of the present invention.

(The Evaluation of Durability)

Further, the evaluation of durability was carried out. When the light modulating materials were illuminated with a Xe lamp (100,000 lux), the light modulating material of the present invention had no change in electric characteristics. On the other hand, the light modulating materials as the comparison was visually confirmed that the light transmittance in the colored state had been lowered when the voltage was applied. That is, it was confirmed that the light modulating material of the present invention was excellent in durability.

Example 4

The Preparation of a Light Modulating Material

After dichroic dyes shown in Table 1 were heated and dissolved in 1.0 g of a host liquid crystal (ZLI-1132), the liquid crystal composition was let alone at room temperature for one day. The amount of each dichroic dye added was adjusted so that the transmittance became 20% when the liquid crystal composition was injected into the 8 μm cell for the liquid crystal evaluation.

Each of the obtained liquid crystal composition was dispersed in the 5% by mass aqueous solution of polyvinyl alcohol (trade name: KURARAY POVAL, manufactured by Kuraray Co., Ltd.) by stirring with a homogenizer to give an aqueous liquid crystal dispersion solution. The average particle diameter of the liquid crystal drop of the obtained dispersion liquid was 5 μm.

A small amount of spherical spacer of 10 μm (manufactured by Sekisui Chemical Co., Ltd.) was mixed, and the obtained aqueous liquid crystal dispersion solution was coated on a glass substrate having ITO with a wire bar, and dried at 80° C. for two hours. Next, the substrate was stuck together with another glass substrate having ITO and sealed to give a light modulating material of the present invention.

(The Evaluation of the Display Performance)

The obtained light modulating material of the present invention was in a scattered and colored state when no voltage was applied. When voltage (20 V, 60 Hz) was applied with a signal generator (manufactured by Tektronix, Inc.), the light modulating material became in a transparent and colorless state. The evaluation of the ratio of the transmittance was carried out by the same method as that in Example 1.

Moreover, the degree of scattering was visually evaluated. As a result, it was confirmed that the light modulating material of the present invention functioned as a light modulating material which was able to control a scattered and colored state and a transparent and colorless state electrically. These results are shown in Table 4.

TABLE 4

| Sample No. | Dichroic Dye No. | Ratio of Transmittance | Degree of Scattering | Remarks |
|---|---|---|---|---|
| V | 1-8 | 3.8 | High | The present invention |
| X | 1-13 | 3.6 | High | The present invention |
| Y | 1-2 | 4.0 | High | The present invention |
| Z | Y-1 | 1.5 | Moderate | Comparison |
| AA | M-1 | 1.3 | Moderate | Comparison |
| AB | C-1 | 1.4 | Moderate | Comparison |

Example 5

The Preparation of a Light Modulating Material

A light modulating material of the present invention was prepared by the same operation as that in Example 1, except for changing the host liquid crystal to the following liquid crystal 1 for dual frequency addressing (manufactured by Sigma-Aldrich Corp.).

<Evaluation>

The light modulating material of the present invention was confirmed to show such high light modulating performance that the material was changed into a transparent and colorless state when a low frequency voltage (100 V, 100 Hz) was applied and into a colored state when a high frequency voltage (100 V, 100 kHz) was applied.

Liquid Crystal 1 for Dual Frequency Addressing

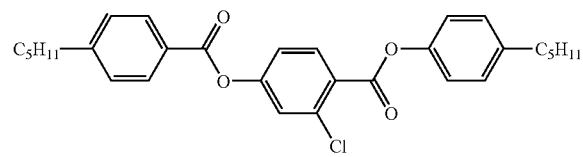

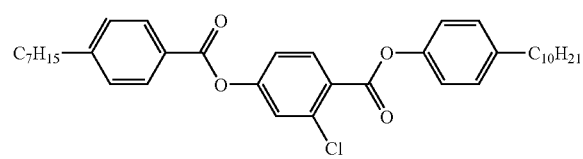

Example 6

The Preparation of a Light Modulating Material

A light modulating material of the present invention was prepared by the same operation as that in Example 2, except for changing the host liquid crystal to a liquid crystal HA-11757 (a nematic liquid crystal, Δn=0.20, manufactured by Asahi Denka Kogyo K.K.) in Example 2.

<Evaluation>

When the same evaluation as that in Example 2 was carried out, it was confirmed that modulated light with a high contrast ratio was possible with the light modulating material of the present invention.

Example 7

The Preparation of a Light Modulating Material

Siloxane polymers, chiral reagents, and dichroic dyes in the following Table 5 were heated and dissolved in 1.0 g of a host liquid crystal E-63 (a nematic liquid crystal, Δn=0.13, manufactured by Merck & Co., Inc.) to prepare liquid crystal compositions. Acetone was used as an auxiliary solvent. The amount of each dichroic dye added was adjusted so that the transmittance became 20% when the liquid crystal composition was injected into the cell of 15 μm for the liquid crystal evaluation. The others were treated with the same operations as those in Example 2, and thus the light modulating material of the present invention was adjusted. Siloxane polymers were synthesized according to the following scheme. In Table 5, the amount of the chiral reagent and that of the siloxane polymer show the mass (% by mass) based on the total mass of the liquid crystal composition.

TABLE 5

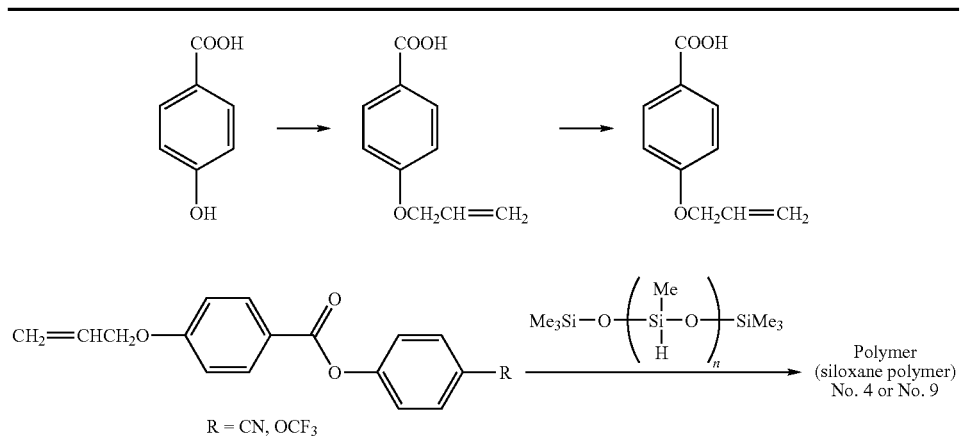

| Sample No. | Dichroic dye No. | Polymer (10% by Mass) | Chiral Reagent (1% by mass) | Ratio of Transmittance | Remarks |
|---|---|---|---|---|---|
| AC | 1-8 | No. 4 | None | 8.4 | The present invention |
| AD | 1-8 | No. 9 | None | 8.9 | The present invention |
| AE | 1-8 | No. 4 | R1011 | 8.6 | The present invention |
| AF | 1-8 | No. 9 | No. 14 | 9.5 | The present invention |
| AG | 1-2 | No. 4 | None | 8.7 | The present invention |

<Evaluation>

When the same evaluation as that in Example 2 was carried out, it was confirmed that modulated light with a high contrast ratio was possible with the light modulating material of the present invention. Moreover, it was confirmed to give also a high light modulating performance by using a polymer and a chiral reagent in combination.

The invention claimed is:

1. A light modulating material comprising at least one kind of dichroic dye having a substituent represented by the following Formula (1) and at least one kind of host liquid crystal, which contains a chiral reagent, between a pair of electrodes, and changing the transmittance of incident light:

$-(Het)_j-\{(B^1)_p-(Q^1)_q-(B^2)_r\}_n-C^1$     Formula (1):

wherein, Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p-(Q^1)_q-(B^2)_r\}$ may be the same or different.

2. The light modulating material according to claim 1, further comprising an ultraviolet absorption layer.

3. The light modulating material according to claim 1, wherein:

a liquid crystal composition which contains the dichroic dye and the host liquid crystal is contained between a pair of supports equipped with transparent electrodes; and a ratio ($T_0/T$), of a light transmittance $T_0$ in a transparent and colorless state to a light transmittance T in a colored state, is in a range of 3 to 1000.

4. The light modulating material according to claim 1, wherein at least one dichroic dyes is a compound represented by the following Formula (2):

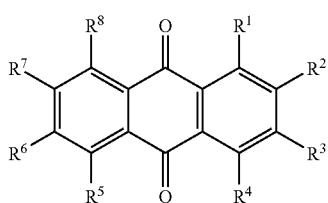

Formula (2)

wherein at least one of $R^1$, $R^2$, $R^3$, $R^4$, $R^5$, $R^6$, $R^7$, and $R^8$ is $-(Het)_j-\{(B^1)_p-(Q^1)_q-(B^2)_r\}_n-C^1$, and the others are each independently a hydrogen atom or a substituent; Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group or an acyloxy group; j represents 0 or 1; p, q and r each independently represent an integer from 0 to 5; n represents an integer from 1 to 3; (p+r)×n is an integer from 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p-(Q^1)_q-(B^2)_r\}$ may be the same or different.

5. The light modulating material according to claim 1, wherein at least one dichroic dyes is a compound represented by the following Formula (3):

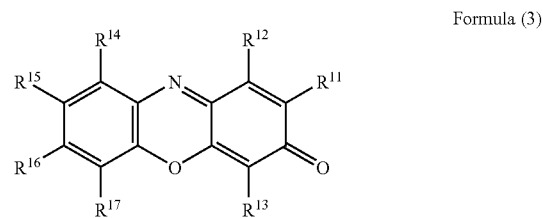

Formula (3)

wherein at least one of $R^{11}$, $R^{12}$, $R^{13}$, $R^{14}$, $R^{15}$, $R^{16}$, and $R^{17}$ is $-(Het)_j-\{(B)_p-(Q^1)_q-(B^2)\}_n-C^1$, and the others are each independently hydrogen atom or a substituent; Het is oxygen atom or sulfur atom; $B^1$ and $B^2$ each independently represent an arylene group, a heteroarylene group or a bivalent cyclic aliphatic hydrocarbon group; $Q^1$ represents a bivalent linking group; $C^1$ represents an alkyl group, a cycloalkyl group, an alkoxy group, an alkoxycarbonyl group, an acyl group, or an acyloxy group; j represents 0 or 1; p, q and r each independently represent an integer from 0 to 5; n represents an integer from 1 to 3; (p+r)×n is an integer of 3 to 10; when p is 2 or larger, two or more groups represented by $B^1$ may be the same or different; when q is 2 or larger, two or more groups represented by $Q^1$ may be the same or different; when r is 2 or larger, two or more groups represented by $B^2$ may be the same or different; and when n is 2 or larger, two or more groups represented by $\{(B^1)_p-(Q^1)_q-(B^2)_r\}$ may be the same or different.

6. The light modulating material according to claim 1, wherein the host liquid crystal is a nematic liquid crystal.

7. The light modulating material according to claim 1, wherein the host liquid crystal exhibits a dual frequency addressing property.

8. The light modulating material according to claim 1, wherein the host liquid crystal contains a polymer.

9. The light modulating material according to claim 1, wherein the material modulates light by:

(1) changing between a colored transparent state and a colorless transparent state;

(2) changing between a colored scattered state and a colorless transparent state;

(3) changing between a high-density colored transparent state and a low-density colored transparent state.

10. The light modulating material according to claim 1, further comprising a polymeric support.

11. The light modulating material of claim 3, wherein the transparent electrodes comprise ITO.

12. The light modulating material according to claim 1, further comprising an alignment film.

13. The light modulating material according to claim 12, wherein the alignment film is a polyimide alignment film or a film formed by a silane coupling agent.

14. The light modulating material according to claim 1, further comprising an antireflection film.

15. The light modulating material according to claim 14, wherein the antireflection film is attached on the surface of a support.

16. The light modulating material according to claim 14, wherein the antireflection film is attached on the surface of a transparent electrode.

17. The light modulating material according to claim 14, wherein the antireflection film is an inorganic film, an organic film, or an inorganic-organic composite film.

18. The light modulating material according to claim 1, further comprising a barrier layer.

19. A light modulating method using the light modulating material according to claim 1, wherein the light modulating material is driven by switching at least between no-voltage application state and a voltage application state.

20. A light modulating method using the light modulating material according to claim 1, wherein the light modulating material is driven by switching between application of voltage having different frequencies.

* * * * *